United States Patent
Lee

(10) Patent No.: US 10,963,175 B2
(45) Date of Patent: Mar. 30, 2021

(54) APPARATUS AND METHOD FOR SEARCHING VALID DATA IN MEMORY SYSTEM

(71) Applicant: SK hynix Inc., Gyeonggi-do (KR)

(72) Inventor: Jong-Min Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 24 days.

(21) Appl. No.: 16/408,606

(22) Filed: May 10, 2019

(65) Prior Publication Data

US 2020/0042181 A1 Feb. 6, 2020

(30) Foreign Application Priority Data

Aug. 6, 2018 (KR) .................... 10-2018-0091320

(51) Int. Cl.
*G06F 3/06* (2006.01)
*G06F 12/02* (2006.01)

(52) U.S. Cl.
CPC .......... *G06F 3/064* (2013.01); *G06F 3/0652* (2013.01); *G06F 3/0679* (2013.01); *G06F 12/0246* (2013.01); *G06F 3/0604* (2013.01); *G06F 2212/7201* (2013.01)

(58) Field of Classification Search
CPC .... G06F 3/0668; G06F 3/0679; G06F 3/0688; G06F 3/0638; G06F 3/064; G06F 3/0644; G06F 3/0646; G06F 3/0647; G06F 3/0649; G06F 3/065; G06F 3/0652; G06F 12/0253; G06F 12/0261; G06F 12/0269; G06F 12/0276
See application file for complete search history.

(56) References Cited

U.S. PATENT DOCUMENTS

| 8,880,775 | B2 * | 11/2014 | Stefanus | G06F 12/0246 711/103 |
| 9,530,436 | B1 * | 12/2016 | Masiewicz | G11B 5/02 |
| 2007/0033330 | A1 * | 2/2007 | Sinclair | G06F 3/064 711/103 |
| 2016/0232088 | A1 * | 8/2016 | Mohan | G06F 12/0246 |
| 2017/0123972 | A1 * | 5/2017 | Gopinath | G06F 12/0253 |
| 2018/0260136 | A1 * | 9/2018 | Huo | G06F 3/068 |
| 2019/0196966 | A1 * | 6/2019 | Hwang | G06F 12/10 |

FOREIGN PATENT DOCUMENTS

| KR | 10-2013-0050124 | 5/2013 |
| KR | 10-2015-0100862 | 9/2015 |

OTHER PUBLICATIONS

M. Yang, Y. Chang, C. Tsao, P. Huang, Y. Chang and T. Kuo, "Garbage collection and wear leveling for flash memory: Past and future," 2014 International Conference on Smart Computing, Hong Kong, 2014, pp. 66-73, doi: 10.1109/Smartcomp.2014.7043841. (Year: 2014).*

S. Jung and Y. Ho Song, "Garbage Collection for Low Performance Variation in NAND Flash Storage Systems," in IEEE Transactions on Computer-Aided Design of Integrated Circuits and Systems, vol. 34, No. 1, pp. 16-28, Jan. 2015, doi: 10.1109/TCAD.2014.2369501. (Year: 2015).*

* cited by examiner

*Primary Examiner* — Khoa D Doan
(74) *Attorney, Agent, or Firm* — IP & T Group LLP

(57) ABSTRACT

A memory system includes a non-volatile memory device including plural memory blocks storing a data; and a controller suitable for increasing a count of blocks to be erasable among the plural memory blocks. The controller can repeatedly search for valid data in a predetermined range of the plural memory blocks during an idle state.

18 Claims, 17 Drawing Sheets

FIG. 11

```
                                            ┌1006C
┌─────────────────────────────────────────┐
│   BLK1        BLK2        BLK3    ...   │
│  ┌─────┐    ┌─────┐     ┌─────┐         │
│  │ PG1 │    │ PG1 │     │ PG1 │         │
│  │ PG2 │    │ PG2 │     │ PG2 │         │
│  │ PG3 │    │ PG3 │     │ PG3 │         │
│  │ PG4 │    │ PG4 │     │ PG4 │  ...    │
│  │  :  │    │  :  │     │  :  │         │
│  └─────┘    └─────┘     └─────┘         │
└─────────────────────────────────────────┘
```

<TB_C>

| GRP | |
|---|---|
| C1 | (BLK1, PG 1 ~ 100), (BLK2, PG 1 ~ 100), ... |
| C2 | (BLK1, PG 101 ~ 200), (BLK2, PG 101 ~ 200), ... |
| C3 | (BLK1, PG 201 ~ 300), (BLK2, PG 201 ~ 300), ... |
| : | : |

<TB_D>

| GRP | |
|---|---|
| D1 | BLK 1 ~ 3 |
| D2 | BLK 4 ~ 6 |
| D3 | BLK 7 ~ 9 |

APPARATUS AND METHOD FOR SEARCHING VALID DATA IN MEMORY SYSTEM

CROSS-REFERENCE TO RELATED APPLICATIONS

This patent application claims priority under 35 U.S.C. § 119(a) to Korean Patent Application No. 10-2018-0091320, filed on Aug. 6, 2018, the entire disclosure of which is incorporated herein by reference.

TECHNICAL FIELD

Exemplary embodiments of the invention relate to a memory system, and more particularly, to an apparatus and a method for enhancing efficiency to find valid data within memory blocks in a non-volatile memory device.

BACKGROUND

Recently, a paradigm for a computer environment has shifted into ubiquitous computing, which enables a computer system to be accessed anytime and everywhere. The use of portable electronic devices such as mobile phones, digital cameras, notebook computers and the like could be rapidly increasing. Such portable electronic devices typically use or include a memory system that uses or embeds at least one memory device, i.e., a data storage device. The data storage device can be used as a main storage device or an auxiliary storage device of a portable electronic device.

Unlike a hard disk, a data storage device using a non-volatile semiconductor memory device is advantageous in that it has excellent stability and durability because it has no mechanical driving part (e.g., a mechanical arm), and has high data access speed and low power consumption. As an example of a memory system having such advantages, a data storage device includes a USB (Universal Serial Bus) memory device, a memory card having various interfaces, a solid state drive (SSD) or the like.

BRIEF DESCRIPTION OF THE DRAWINGS

The description herein makes reference to the accompanying drawings wherein like reference numerals refer to like parts throughout the several views, and wherein:

FIG. 11 is a diagram illustrating data in a non-volatile memory device which is divided by size units of map data in accordance with an embodiment of the disclosure;

DETAILED DESCRIPTION

Figure 1:
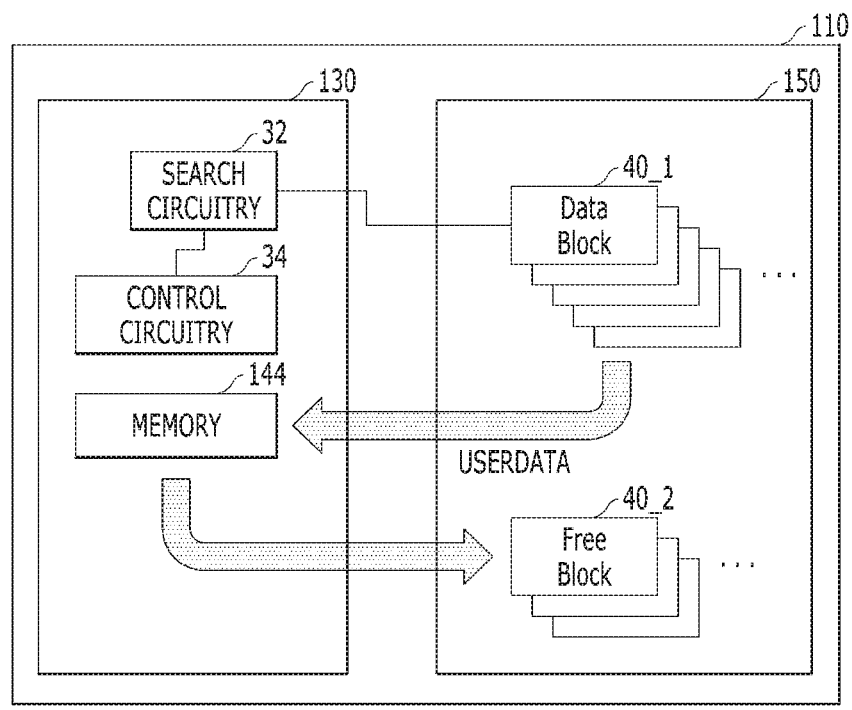
FIG. 1 is a diagram describing operations in a memory system in accordance with an embodiment of the disclosure.

Various examples of the disclosure are described below in more detail with reference to the accompanying drawings. The disclosure may be embodied in different other embodiments, forms and variations thereof and should not be construed as being limited to the embodiments set forth herein. Rather, the described embodiments are provided so that this disclosure will be thorough and complete, and will fully convey the disclosure to those skilled in the art to which this invention pertains. Throughout the disclosure, like reference numerals refer to like parts throughout the various figures and examples of the disclosure. It is noted that reference to "an embodiment" does not necessarily mean only one embodiment, and different references to "an embodiment" are not necessarily to the same embodiment(s).

It will be understood that, although the terms "first", "second", "third", and so on may be used herein to describe various elements, these elements are not limited by these terms. These terms are used to distinguish one element from another element. Thus, a first element described below could also be termed a second or third element without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the disclosure and the relevant art, and will not be interpreted in an idealized or overly formal sense unless expressly so defined herein.

In the following description, numerous specific details are set forth in order to provide a thorough understanding of the invention. The invention may be practiced without some or all of these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Embodiments of the disclosure can provide a memory system, a data processing system, and an operation process or a method, which can quickly and reliably process data into a memory device by reducing operational complexity and performance degradation of the memory system thereby enhancing usage efficiency of the memory device.

Embodiments of the disclosure can provide an apparatus and a method for splitting blocks in a memory device into several ranges in the process of searching for valid data in a memory device. It is possible to efficiently manage the time of a background operation for wear leveling or garbage collection by reducing the search time for valid data.

In addition, an embodiment of the disclosure may divide blocks in a memory device into several groups. The memory system can find or search for valid data in each group, not overall in a large-capacity memory device, at once, but the memory system may repeatedly perform effective data search for each predetermined group in the large-capacity memory device. Accordingly, the memory system can perform a foreground or background operation within every group through an effective data search, not by using the overall memory device. The disclosure can provide a method and apparatus capable of reducing an environment in which a specific operation can interfere with other operations performed within a memory system when plural command operations corresponding to plural commands or instructions are performed on the memory system simultaneously or alternatively, so that operation stability and reliability of the memory system can be improved or enhanced.

In an embodiment, a memory system can include a non-volatile memory device including plural memory blocks storing a data; and a controller suitable for increasing a count of blocks to be erasable among the plural memory blocks. Herein, the controller may repeatedly search for valid data in a predetermined range of the plural memory blocks during an idle state.

By the way of example but not limitation, the predetermined range can be determined based at least on a storage capability of a volatile memory included in, or directly engaged with and controlled by, the controller.

In an embodiment, the controller can search for the valid data until no more valid data is temporarily stored in the volatile memory. For example, the controller may access each block in the non-volatile memory device, loads all of the data of each block in the volatile memory, and selects or chooses valid data only among all of the data for re-storing selected data in the non-volatile memory device.

In another embodiment, the controller can access each block in the non-volatile memory device and loads valid data only in each block to the volatile memory.

In another example, the predetermined range corresponds to a size of data unit entered from a host. The predetermined range may be determined by dividing a data region, notified to the host, of the non-volatile memory device by N (N is an integer larger than 1).

In another example, the predetermined range can be determined based at least on a size of data region of the non-volatile memory device, which is determined by the host as a data region in which no valid data is stored.

In another example, the predetermined range can correspond to a size of map data stored in the non-volatile memory device. The predetermined range may be determined by dividing the size of map data by N (N is an integer larger than 1).

By the way of example but not limitation, the controller transfers searched valid data into an empty block of the non-volatile memory device.

The controller can update a new address of transferred data in the empty block to a map table of the non-volatile memory device.

For example, the controller can measure a time between starting a search for valid data in a first range and updating an address for searched and transferred data. Then, the controller may perform at least one of starting a search for valid data in another range when measured time is shorter than a threshold and terminating the search for valid data in another range when the measured time is equal to, or longer than, the threshold.

When all pages in a block in the non-volatile memory device do not have any address linked with the map table, the controller can erase the block.

In an embodiment, the controller can include a search circuit for searching for the valid data in the predetermined range; and a search controller for determining a time for searching and the predetermined range to be searched, and receiving a search result from the search unit.

In an embodiment, a method for operating a memory system can include monitoring whether an operation corresponding to a command entered from a host is carried out within a non-volatile memory device; repeatedly searching for valid data in each predetermined range of the plural memory blocks during an idle state to increase a count of blocks to be erasable in the non-volatile memory device; and transferring searched valid data into an empty block in the non-volatile memory device.

The method can further include updating a new address of transferred valid data to the empty block to a map table of the non-volatile memory device.

The method can further include measuring a time between starting a search for valid data in a first range and updating an address for searched and transferred data. The method can include at least one of starting a search for valid data in another range when measured time is shorter than a threshold and terminating the search for valid data in another range when the measured time is equal to, or longer than, the threshold.

The method can further include erasing a block when all pages in the block in the non-volatile memory device do not have any address linked with the map table.

By the way of example but not limitation, the predetermined range can be determined based at least on at least one of a storage capability of a volatile memory included in, or directly engaged with and controlled by, the controller, a size of data region notified to a host, and a size of map data stored in the non-volatile memory device.

In another embodiment, a memory system can include a memory device including a plurality of data blocks and free blocks; a memory unit suitable for buffering data; and a control unit suitable for controlling, while the memory device is idle, an operation for: searching for valid data within a predetermined amount of data stored in the data blocks, buffering the searched data in the memory unit, and programming the buffered data into the free blocks. The predetermined amount can be such an amount that the control unit completes the operation at least once while the memory device is idle.

Hereinafter, embodiments of the disclosure will be described in detail with reference to the accompanied drawings.

In FIG. 1, a memory system 10 in accordance with an embodiment of the disclosure is described. The memory system 110 can include a controller 130 and a memory device 150. The memory system 110 may be engaged with another device, e.g., a computing device.

Referring to FIG. 1, a number of blocks that can erase data among a plurality of blocks may increase in the non-volatile memory device 150. Valid data stored in a first block 40_1 of the memory device 150 can be moved into a free block 40_2 to secure a marginal memory space used for storing a large amount of data, or by performing garbage collection (GC) or wear leveling.

In an embodiment of the disclosure, an operation of the memory system can be relevant to a garbage collection (GC) operation. The embodiment can provide an apparatus and a method for searching for a block used to perform garbage collection by managing a time spent on garbage collection. The garbage collection may include an operation of searching for a memory area dynamically allocated, which is no longer usable or needlessly used, and deleting data in the searched area to prepare for programming new data. The time required to erase data contained in a specific area in the nonvolatile memory device may vary depending on the cell structure or cell characteristics of the nonvolatile memory device.

A time spent on searching for a memory area to be erased in the nonvolatile memory device may vary depending on a method and an apparatus for controlling the nonvolatile memory device. To increase the efficiency of the garbage collection, it might be preferable to reduce a time spent in other processes (e.g., search, transferring or updating), rather than to reduce a time for the longest process (e.g., a block erase).

Embodiments of the disclosure will now be described in detail with reference to the accompanying drawings, wherein like numbers reference like elements.

Figure 2:
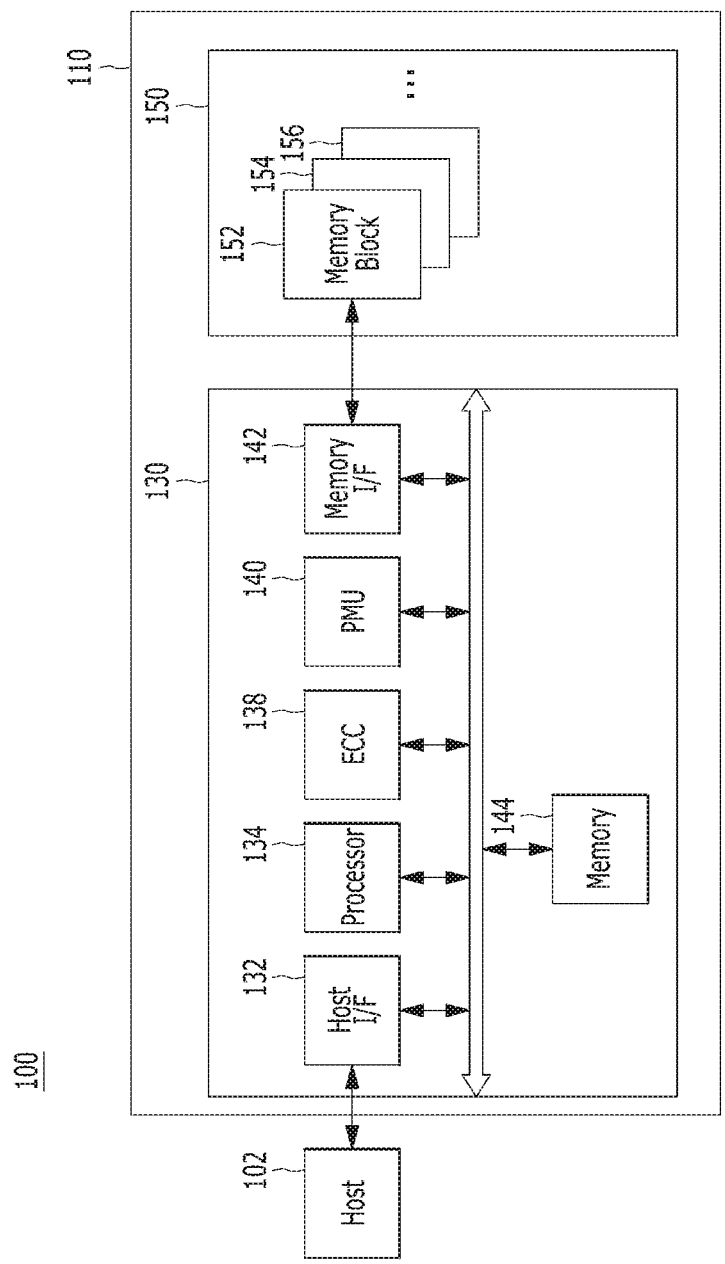
FIG. 2 is a block diagram showing a data processing system including a memory system in accordance with an embodiment of the disclosure.

Referring to FIG. 1, garbage collection (GC) can be performed by the memory system itself without commands or instructions transmitted from a host 102 (see, FIG. 2). The controller 130 in the memory system 110 can read a user data from the plurality of data blocks 40_1 of the memory device 150, temporarily store the user data in the memory 144 disposed within, or directly engaged with and be controlled by, the controller 130, and program the user data loaded in the memory 144 into the free block 40_2 of the memory device 150. Here, the plurality of data blocks 40_1 may include blocks that can no longer be programmed with new data without an erase.

The controller 130 includes a search circuitry 32 configured to search for valid data in a predetermined range of the memory device 150 and a search control circuitry 34 configured to determine a search time and a predetermined search range. The search control circuitry 34 can receive the search result from the search circuitry 32 and transmit the search result to the memory 144. Here, the controller 30 may include at least one processor and at least one memory device. In accordance with an embodiment, the search circuitry 32 and/or the search control circuitry 34 may be implemented with various-type components designed to search for valid data using at least one memory device.

As used in the disclosure, the term 'circuitry' can refer to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to a particular claim element, an integrated circuit for a storage device.

For garbage collection, the controller 130 should search for valid data in a plurality of data blocks 40_1. In accordance with an embodiment of the disclosure, the controller 30 does not search for valid data in all the data blocks 40_1 at a time, but can search for valid data only within a predetermined range of the data blocks 40_1 at a time. In this case, it is possible to reduce resources (e.g., time, power) required to search for valid data to be moved into the free block 40_2 for garbage collection due to the reduced range of the search for valid data within the data blocks 40_1 during a single garbage collection.

In FIG. 2, a data processing system 100 in accordance with an embodiment of the disclosure is described. Referring to FIG. 2, the data processing system 100 may include a host 102 engaged or interlocked with a memory system 110.

The host 102 may include, for example, a portable electronic device such as a mobile phone, an MP3 player and a laptop computer, or an electronic device such as a desktop computer, a game player, a television (TV), a projector and the like.

The host 102 also includes at least one operating system (OS), which can generally manage, and control, functions and operations performed in the host 102. The OS can provide interoperability between the host 102 engaged with the memory system 110 and the user needing and using the memory system 110. The OS may support functions and operations corresponding to user's requests. By the way of example but not limitation, the OS can be classified into a general operating system and a mobile operating system according to mobility of the host 102. The general operating system may be split into a personal operating system and an enterprise operating system according to system requirements or a user's environment. The personal operating system, including Windows and Chrome, may be subject to support services for general purposes. But the enterprise operating systems can be specialized for securing and supporting high performance, including Windows servers, Linux, Unix and the like. Further, the mobile operating system may include an Android, an iOS, a Windows mobile and the like. The mobile operating system may be subject to support services or functions for mobility (e.g., a power saving function). The host 102 may include a plurality of operating systems. The host 102 may execute multiple operating systems interlocked with the memory system 110, corresponding to a user's request. The host 102 may transmit a plurality of commands corresponding to the user's requests into the memory system 110, thereby performing operations corresponding to commands within the memory system 110. Handling plural commands in the memory system 110 is described later, in reference to FIGS. 4 and 5.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of suitable storage devices include a solid state drive (SSD), a multimedia card (MMC), an embedded MMC (eMMC), a reduced size MMC (RS-MMC), a micro-MMC, a secure digital (SD) card, a mini-SD, a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, for example, a dynamic random access memory (DRAM) and a static RAM (SRAM), and/or a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM or ReRAM) and a flash memory.

The memory system 110 may include a controller 130 and a memory device 150. The memory device 150 may store data to be accessed by the host 102. The controller 130 may control storage of data in the memory device 150.

The controller 130 and the memory device 150 may be integrated into a single semiconductor device, which may be included in the various types of memory systems as exemplified above.

By the way of example but not limitation, the controller 130 and the memory device 150 may be integrated into a single semiconductor device. The controller 130 and memory device 150 configuring an SSD may be integrated into a single semiconductor device, for improving an operation speed. When the memory system 110 is used as an SSD, the operating speed of the host 102 connected to the memory system 110 can be improved more than that of the host 102 implemented with a hard disk. In addition, the controller 130 and the memory device 150 integrated into one semiconductor device may form a memory card. For example, a PC card (PCMCIA), a compact flash card (CF), a memory card such as a smart media card (SM, SMC), a memory sticks, a multimedia card (MMC, RS-MMC, MMCmicro), a SD card (SD, miniSD, microSD, SDHC), a universal flash memory and the like.

The memory system 110 may be configured as a part of, for example, a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3-dimensional (3D) television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various components configuring a computing system.

The memory device 150 may be a nonvolatile memory device and may retain data stored therein even while an electrical power is not supplied. The memory device 150 may store data provided from the host 102 through a write operation, while providing data stored therein to the host 102 through a read operation. The memory device 150 may include a plurality of memory blocks 152, 154, 156. Each of the memory blocks 152, 154, 156 may include a plurality of pages. Each of the plurality of pages may include a plurality of memory cells to which a plurality of word lines (WL) are electrically coupled. The memory device 150 also includes a plurality of memory dies, each of which includes a plurality of planes, each of which includes a plurality of memory blocks 152, 154, 156. In addition, the memory device 150 may be a non-volatile memory device, for example a flash memory, wherein the flash memory may be a three-dimensional stack structure.

The controller 130 may control overall operations of the memory device 150, such as read, write, program and erase operations. For example, the controller 130 may control the memory device 150 in response to a request from the host 102. The controller 130 may provide the data, read from the memory device 150, with the host 102. The controller 130 may store the data, provided by the host 102, into the memory device 150.

The controller 130 may include a host interface (I/F) 132, a processor 134, an error correction code (ECC) unit 138, a power management unit (PMU) 140, a memory interface (I/F) 142 and a memory 144, all operatively coupled via an internal bus.

The host interface 132 may process commands and data provided from the host 102, and may communicate with the host 102 through at least one of various interface protocols such as universal serial bus (USB), multimedia card (MMC), peripheral component interconnect-express (PCI-e or PCIe), small computer system interface (SCSI), serial-attached SCSI (SAS), serial advanced technology attachment (SATA), parallel advanced technology attachment (DATA), small computer system interface (SCSI), enhanced small disk interface (ESDI) and integrated drive electronics (IDE). In accordance with an embodiment, the host interface unit 132 is a component for exchanging data with the host 102, which may be implemented through a firmware called a host interface layer (HIL).

The ECC unit 138 can correct error bits of the data to be processed in (e.g., outputted from) the memory device 150, which may include an ECC encoder and an ECC decoder. Here, the ECC encoder can perform error correction encoding of data to be programmed in the memory device 150 to generate encoded data into which a parity bit is added and store the encoded data in memory device 150. The ECC decoder can detect and correct errors contained in a data read from the memory device 150 when the controller 130 reads the data stored in the memory device 150. In other words, after performing error correction decoding on the data read from the memory device 150, the ECC unit 138 can determine whether the error correction decoding has succeeded and output an instruction signal (e.g., a correction success signal or a correction fail signal). The ECC unit 138 can use the parity bit which is generated during the ECC encoding process, for correcting the error bit of the read data. When the number of the error bits is greater than or equal to a threshold number of correctable error bits, the ECC unit 138 may not correct error bits but may output an error correction fail signal indicating failure in correcting the error bits.

The ECC unit 138 may perform an error correction operation based on a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and so on. The ECC unit 138 may include all or some of circuits, modules, systems or devices for performing the error correction operation based on at least one of the above described codes.

The PMU 140 may manage an electrical power provided in the controller 130.

The memory interface 142 may serve as an interface for handling commands and data transferred between the controller 130 and the memory device 150, to allow the controller 130 to control the memory device 150 in response to a request delivered from the host 102. The memory interface 142 may generate a control signal for the memory device 150 and may process data entered into or outputted from the memory device 150 under the control of the processor 134 in a case when the memory device 150 is a flash memory and, in particular, when the memory device 150 is a NAND flash memory. The memory interface unit 142 can provide an interface for handling commands and data between the controller 130 and the memory device 150, for example, operations of NAND flash interface, in particular, operations between the controller 130 and the memory device 150. In accordance with an embodiment, the memory interface unit 142 can be implemented through a firmware called a Hash Interface Layer (FIL) as a component for exchanging data with the memory device 150.

The memory 144 may support operations performed by the memory system 110 and the controller 130. The memory 144 may store temporary or transactional data occurred or delivered for operations in the memory system 110 and the controller 130. The controller 130 may control the memory device 150 in response to a request from the host 102. The controller 130 may deliver data read from the memory device 150 into the host 102. The controller 130 may store data entered through the host 102 within the memory device 150. The memory 144 may be used to store data required for the controller 130 and the memory device 150 to perform operations such as read operations or program/write operations.

The memory 144 may be implemented with a volatile memory. The memory 144 may be implemented with a static random access memory (SRAM), a dynamic random access memory (DRAM) or both. Although FIG. 1 exemplifies the second memory 144 disposed within the controller 130, the embodiment is not limited thereto. That is, the memory 144 may be located inside or outside the controller 130. For instance, the memory 144 may be embodied by an external volatile memory having a memory interface transferring data and/or signals between the memory 144 and the controller 130.

The memory 144 can store data necessary for performing operations such as data writing and data reading requested by the host 102 and/or data transfer between the memory device 150 and the controller 130 for background operations such as garbage collection and wear levelling as described above. In accordance with an embodiment, for supporting operations in the memory system 110, the memory 144 may include a program memory, a data memory, a write buffer/cache, a read buffer/cache, a data buffer/cache, a map buffer/cache, and the like.

The processor 134 may be implemented with a microprocessor or a central processing unit (CPU). The memory system 110 may include one or more processors 134. The processor 134 may control the overall operations of the memory system 110. By way of example but not limitation, the processor 134 can control a program operation or a read operation of the memory device 150, in response to a write request or a read request entered from the host 102. In accordance with an embodiment, the processor 134 may use or execute a firmware to control the overall operations of the memory system 110. Herein, the firmware may be referred to as a flash translation layer (FTL). The FTL may perform an operation as an interface between the host 102 and the memory device 150. The host 102 may transmit requests for write and read operations to the memory device 150 through the FTL.

The FTL may manage operations of address mapping, garbage collection, wear-leveling and so forth. Particularly, the FTL may load, generate, update, or store map data. Therefore, the controller 130 may map a logical address, which is entered from the host 102, with a physical address of the memory device 150 through the map data. The memory device 150 may look like a general storage device to perform a read or write operation because of the address mapping operation. Also, through the address mapping operation based on the map data, when the controller 130 tries to update data stored in a particular page, the controller 130 may program the updated data on another empty page and may invalidate old data of the particular page (e.g., update a physical address, corresponding to a logical address of the updated data, from the previous particular page to the another newly programed page) due to a characteristic of a flash memory device. Further, the controller 130 may store map data of the new data into the FTL.

For example, when performing an operation requested from the host 102 in the memory device 150, the controller 130 uses the processor 134 implemented in a microprocessor or central processing unit (CPU) or the like. The processor 134 engaged with the memory device 150 can handle instructions or commands corresponding to an inputted command from the host 102. The controller 130 can perform a foreground operation as a command operation, corresponding to an command inputted from the host 102, such as a program operation corresponding to a write command, a read operation corresponding to a read command, an erase/discard operation corresponding to an erase/discard command and a parameter set operation corresponding to a set parameter command or a set feature command with a set command.

For another example, the controller 130 may perform a background operation on the memory device 150 through the processor 134. By way of example but not limitation, the background operation for the memory device 150 includes an operation (e.g., a garbage collection (GC) operation) for copying and storing data stored in an arbitrary memory block among the memory blocks 152, 154, 156 in the memory device 150 to another arbitrary memory block. The background operation can include an operation (e.g., a wear leveling (WL) operation) to move or swap data stored in at least one of the memory blocks 152, 154, 156 in a memory device 150, into at least another of the memory blocks 152, 154, 156. During a background operation, the controller 130 may use the processor 134 for storing the map data stored in the controller 130 to at least one of the memory blocks 152, 154, 156 in the memory device 150, e.g., a map flush operation. A bad block management operation for checking bad blocks in the plurality of memory blocks 152, 154, 156 included in the memory device 150 is one of other background operation examples performed by the processor 134.

In accordance with an embodiment, the controller 130 and the second memory 144 shown in FIG. 1 may be implemented through at least one processor 134 and at least one memory 144 in the controller 130 described in FIG. 2. For example, the search circuitry 32 and the search control circuitry 34 shown in FIG. 1 can be implemented with at least one processor 134 and at least one memory 144 in the controller 130 described in FIG. 2.

In the memory system 110, the controller 130 performs a plurality of command operations corresponding to a plurality of commands entered from the host 102. For example, when performing a plurality of program operations corresponding to plural program commands, a plurality of read operations corresponding to plural read commands and a plurality of erase operations corresponding to plural erase commands sequentially, randomly or alternatively, the controller 130 can determine which channel(s) or way(s) in a plurality of channels (or ways) for connecting the controller 130 to a plurality of memory dies included in the memory 150 is/are proper or appropriate for performing each operation. The controller 130 can send or transmit data or instructions via determined channels or ways for performing each operation. The plurality of memory dies included in the memory 150 can transmit an operation result via the same channels or ways, respectively, after each operation is complete. Then, the controller 130 may transmit a response or an acknowledge signal to the host 102. In an embodiment, the controller 130 can check a status of each channel or each way. In response to a command entered from the host 102, the controller 130 may select at least one channel or way based on the status of each channel or each way so that instructions and/or operation results with data may be delivered via selected channel(s) or way(s).

By the way of example but not limitation, the controller 130 can recognize statuses regarding a plurality of channels (or ways) associated with a plurality of memory dies included in the memory device 150. The controller 130 may determine each channel or each way as one of a busy state, a ready state, an active state, an idle state, a normal state and/or an abnormal state. The controller's determination of which channel or way an instruction (and/or a data) is delivered through can be associated with a physical block address, e.g., which die(s) the instruction (and/or the data) is delivered into. The controller 130 can refer to descriptors delivered from the memory device 150. The descriptors can include a block or page of parameters that describe something about the memory device 150, which is a data with a predetermined format or structure. For instance, the descriptors may include device descriptors, configuration descriptors, unit descriptors, and the like. The controller 130 can refer to, or use, the descriptors to determine which channel(s) or way(s) an instruction or a data is exchanged via.

A management unit (not shown) may be included in the processor 134. The management unit may perform bad block management of the memory device 150. The management unit may find bad memory blocks included in the memory device 150, which are in unsatisfactory condition for further use, as well as perform bad block management on the bad memory blocks. When the memory device 150 is a flash memory, for example, a NAND flash memory, a program failure may occur during the write operation, for example, during the program operation, due to characteristics of a NAND logic function. During the bad block management, the data of the program-failed memory block or the bad memory block may be programmed into a new memory block. The bad blocks may seriously aggravate the utilization efficiency of the memory device 150 having a 3D stack structure and the reliability of the memory system 110. Thus, reliable bad block management may enhance or improve performance of the memory system 110.

Figure 3:
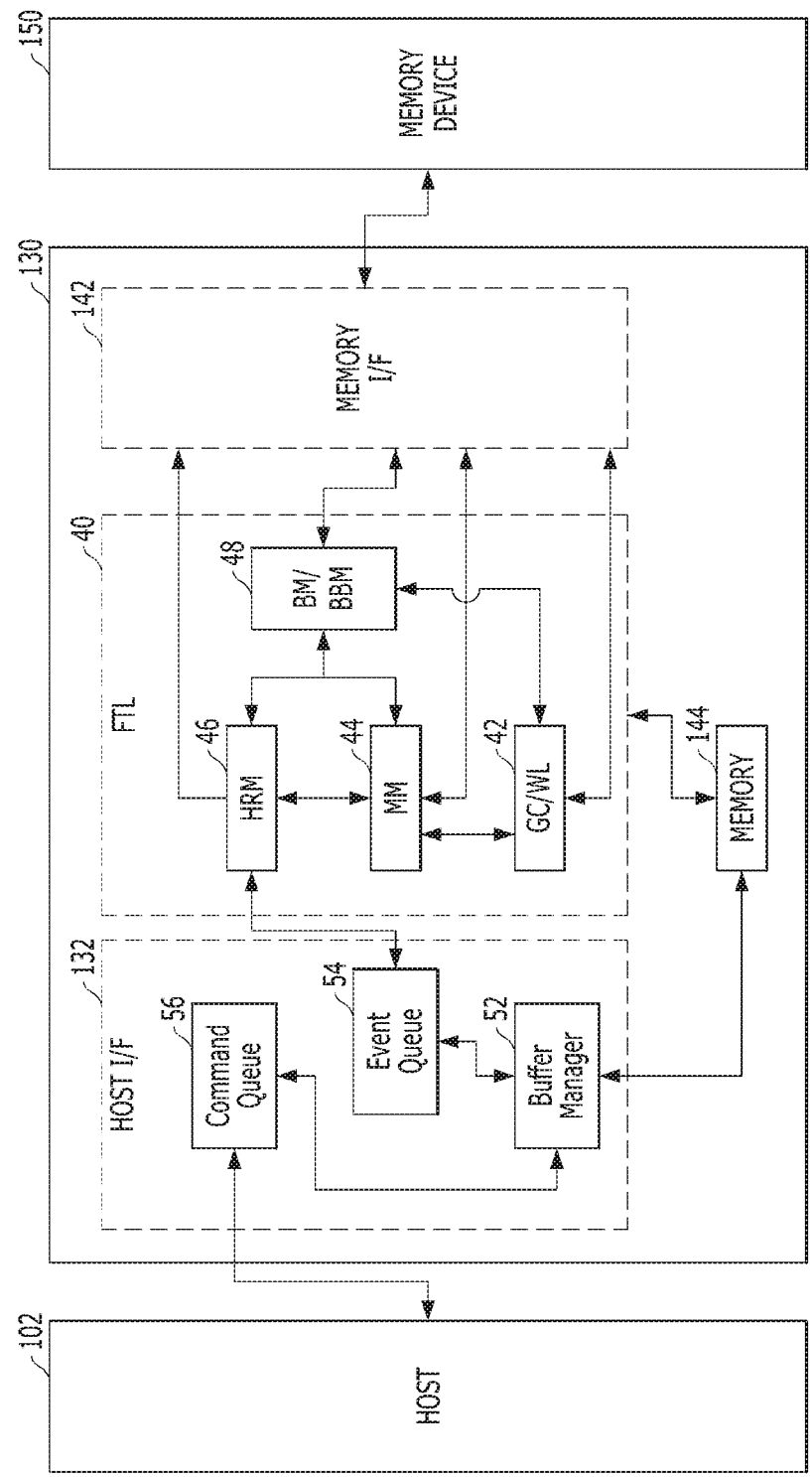
FIG. 3 is a block diagram illustrating a memory system in accordance with an embodiment of the disclosure.

Referring to FIG. 3, a controller in a memory system in accordance with another example of the disclosure is described in detail. The controller 130 cooperates with the host 102 and the memory device 150. The controller 130 can include a host interface unit 132, a flash translation layer (FTL) unit 40, a memory interface unit 142 and a memory 144.

Although not shown in FIG. 3, in accordance with an embodiment, the ECC unit 138 described in FIG. 2 may be included in the flash translation layer (FTL) unit 40. In another embodiment, the ECC unit 138 may be implemented as a separate module, a circuit, a firmware or the like, which is included in, or associated with, the controller 130.

The host interface unit 132 is for handling commands, data, and the like transmitted from the host 102. By way of example but not limitation, the host interface unit 132 can include a command queue 56, a buffer manager 52 and an event queue 54. The command queue 56 can sequentially store commands, data, and the like transmitted from the host 102 and output them to the buffer manager 52 in a stored order. The buffer manager 52 can classify, manage or adjust the commands, the data, and the like, which are delivered from the command queue 56. The event queue 54 can sequentially transmit events for processing the commands, the data, and the like transmitted from the buffer manager 52.

A plurality of commands or data of the same characteristic may be continuously transmitted from the host 102, or commands and data of different characteristics may be transmitted to the memory system 110 after being mixed or jumbled. For example, a plurality of commands for reading data (read commands) may be delivered, or commands for reading data (read command) and programming/writing data (write command) may be alternately transmitted to the memory system 110. The host interface unit 132 can store commands, data, and the like, which are transmitted from the host 102, to the command queue 56 sequentially. Thereafter, the host interface unit 132 can estimate or predict what kind of operation the controller 130 will perform according to the characteristics of the command, data, etc., which is transmitted from the host 102. The host interface unit 132 can determine a processing order and a priority of commands, data and the like, based at least on their characteristics. According to characteristics of commands, data, and the like transmitted from the host 102, the buffer manager 52 in the host interface unit 132 is configured to determine whether the buffer manager should store commands, data, and the like in the memory 144, or whether the buffer manager should deliver the commands, the data, and the like into the flash translation layer (FTL) unit 40. The event queue 54 receives events, entered from the buffer manager 52, which are to be internally executed and processed by the memory system 110 or the controller 130 in response to the commands, the data, etc. transmitted from the host 102, so as to deliver the events into the flash translation layer (FTL) unit 40 in the order received.

In accordance with an embodiment, the host interface unit 132 described in FIG. 3 may perform the functions of the controller 130 described in FIG. 1. The host interface unit 132 may set the first memory 104 included in the host 102 as a slave and add the first memory 104 as an additional storage space which is controllable or usable by the controller 130.

In accordance with an embodiment, the flash translation layer (FTL) unit 40 can include a host request manager (HRM) 46, a map manager (MM) 44, a state manager 42 and a block manager 48. The host request manager (HRM) 46 can manage the events entered from the event queue 54. The map manager (MM) 44 can handle or control a map data. The state manager 42 can perform garbage collection or wear leveling. The block manager 48 can execute commands or instructions onto a block in the memory device 150.

By the way of example but not limitation, the host request manager (HRM) 46 can use the map manager (MM) 44 and the block manager 48 to handle or process requests according to the read and program commands, and events which are delivered from the host interface unit 132. The host request manager (HRM) 46 can send an inquiry request to the map data manager (MM) 44, to figure out a physical address corresponding to the logical address which is entered with the events. The host request manager (HRM) 46 can send a read request with the physical address to the memory interface unit 142, to process the read request (handle the events). On the other hand, the host request manager (HRM) 46 can send a program request (write request) to the block manager 48, to program entered data to a specific page of the unrecorded (no data) in the memory device 150, and then, can transmit a map update request corresponding to the program request to the map manager (MM) 44, to update an item relevant to the programmed data in information of mapping the logical-physical addresses to each other.

Here, the block manager 48 can convert a program request delivered from the host request manager (HRM) 46, the map data manager (MM) 44, and/or the state manager 42 into a flash program request used for the memory device 150, to manage flash blocks in the memory device 150. In order to maximize or enhance program or write performance of the memory system 110 (see FIG. 2), the block manager 48 may collect program requests and send flash program requests for multiple-plane and one-shot program operations to the memory interface unit 142. It can be plausible that the block manager 48 sends several flash program requests to the memory interface unit 142 to enhance or maximize parallel processing of the multi-channel and multi-directional flash controller.

On the other hand, the block manager 48 can be configured to manage blocks in the memory device 150 according to the number of valid pages, select and erase blocks having no valid pages when a free block is needed, and select a block including the least valid page when it is determined that garbage collection is necessary. The state manager 42 can perform garbage collection to move the valid data to an empty block and erase the blocks containing the moved valid data so that the block manager 48 may have enough free blocks (empty blocks with no data). If the block manager 48 provides information regarding a block to be erased to the state manager 42, the state manager 42 could check all flash pages of the block to be erased to determine whether each page is valid. For example, to determine validity of each page, the state manager 42 can identify a logical address recorded in an out-of-band (OOB) area of each page. To determine whether each page is valid, the state manager 42 can compare the physical address of the page with the physical address mapped to the logical address obtained from the inquiry request. The state manager 42 sends a program request to the block manager 48 for each valid page. A mapping table can be updated through the update of the map manager 44 when the program operation is complete.

The map manager 44 can manage a logical-physical mapping table. The map manager 44 can process requests such as queries, updates, and the like, which are generated by the host request manager (HRM) 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface unit 142 to load a relevant mapping table stored in the memory device 150. When the number of dirty cache blocks in the map manager 44 exceeds a certain threshold, a program request can be sent to the block manager 48 so that a clean cache block is made and the dirty map table may be stored in the memory device 150.

On the other hand, when garbage collection is performed, the state manager 42 copies valid page(s) into a free block, and the host request manager (HRM) 46 can program the latest version of the data for the same logical address of the page and currently issue an update request. When the status manager 42 requests the map update in a state in which copying of valid page(s) is not completed normally, the map manager 44 may not perform the mapping table update. It is because the map request is issued with old physical information if the status manger 42 requests a map update and a valid page copy is completed later. The map manager 44 may perform a map update operation to ensure accuracy only if the latest map table still points to the old physical address.

In accordance with an embodiment, the state manager 42 can include the search circuitry 32 and the search control circuitry 34 shown in FIG. 1.

The memory device 150 can include a plurality of memory blocks. The plurality of memory blocks can be classified into different types of memory blocks such as a single level cell (SLC) memory block, a multi level cell (MLC) Cell) memory block or the like, according to the number of bits that can be stored or represented in one memory cell. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have larger storage capacity in the same space than the SLC memory block. The MLC memory block can be highly integrated in a view of storage capacity. In an embodiment, the memory device 150 may be implemented with MLC memory blocks such as an MLC memory block, a triple level cell (TLC) memory block, a quadruple level cell (QLC) memory block and a combination thereof. The MLC memory block may include a plurality of pages implemented by memory cells, each capable of storing 2-bit data. The triple level cell (TLC) memory block can include a plurality of pages implemented by memory cells, each capable of storing 3-bit data. The quadruple level cell (QLC) memory block can include a plurality of pages implemented by memory cells, each capable of storing 4-bit data. In another embodiment, the memory device 150 can be implemented with a block including a plurality of pages implemented by memory cells, each capable of storing 5-bit or more bit data.

In an embodiment of the disclosure, the memory device 150 is embodied as a nonvolatile memory such as a flash memory such as a NAND flash memory, a NOR flash memory and the like. But, the memory device 150 may be implemented by at least one of a phase change random access memory (PCRAM), a ferroelectrics random access memory (FRAM), a spin injection magnetic memory (STT-RAM), and a spin transfer torque magnetic random access memory (STT-MRAM), or the like.

Figure 4:
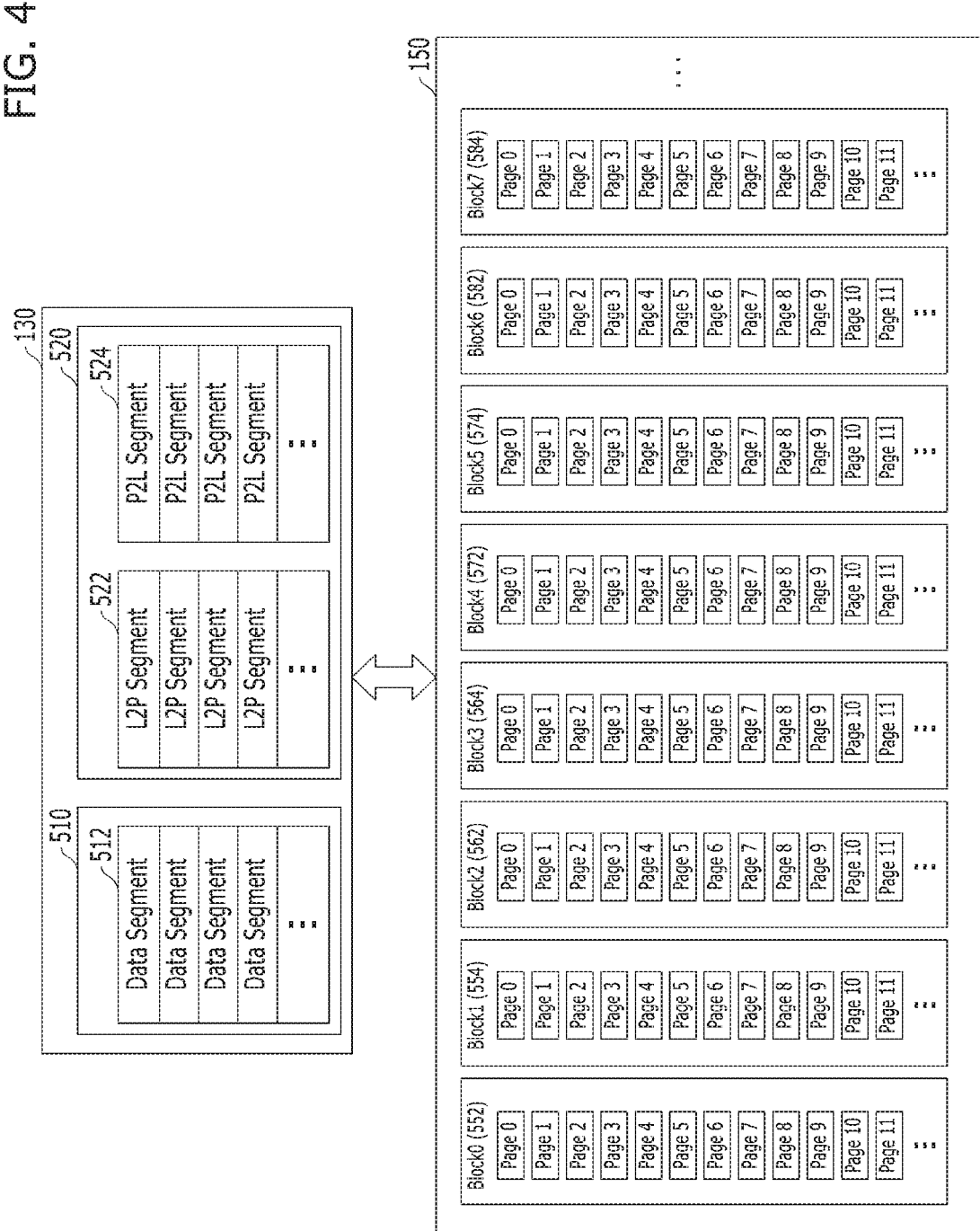
FIGS. 4 and 5 are diagram illustrating a memory system in accordance with an embodiment of the disclosure which performs a plurality of command operations corresponding to a plurality of commands.
Figure 5:
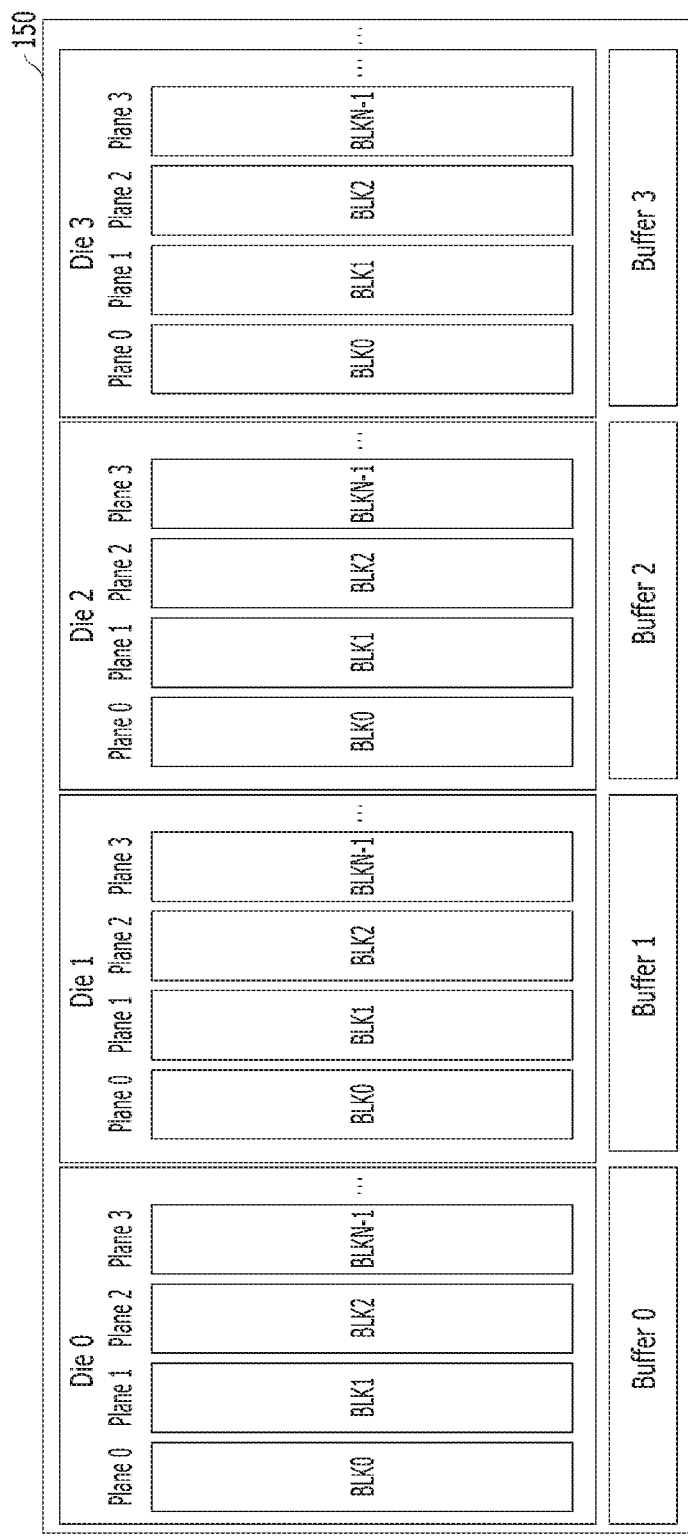

FIGS. 4 and 5 schematically describe performing a plurality of command operations corresponding to a plurality of commands in the memory system in accordance with an embodiment of the disclosure. For example, in the embodiment of the disclosure, detailed descriptions will be made for a data processing operation in a case where a plurality of write commands are received from the host 102 and program operations corresponding to the write commands are performed, in another case where a plurality of read commands are received from the host 102 and read operations corresponding to the read commands are performed, in another case where a plurality of erase commands are received from the host 102 and erase operations corresponding to the erase commands are performed, or in another case where a plurality of write commands and a plurality of read commands are received together from the host 102 and program operations and read operations corresponding to the write commands and the read commands are performed.

Moreover, in the embodiment of the disclosure, descriptions will be made by taking as an example a case where: write data corresponding to a plurality of write commands entered from the host 102 are stored in the buffer/cache included in the memory 144 of the controller 130, the write data stored in the buffer/cache are programmed to and stored in the plurality of memory blocks included in the memory device 150, map data are updated in correspondence to the stored write data in the plurality of memory blocks, and the updated map data are stored in the plurality of memory blocks included in the memory device 150. In the embodiment of the disclosure, descriptions will be made by taking a case where program operations corresponding to a plurality of write commands entered from the host 102 are performed. Furthermore, in the embodiment of the disclosure, descriptions will be made by taking a case where: a plurality of read commands are entered from the host 102 for the data stored in the memory device 150, data corresponding to the read commands are read from the memory device 150 by checking the map data of the data corresponding to the read commands, the read data are stored in the buffer/cache included in the memory 144 of the controller 130, and the data stored in the buffer/cache are provided to the host 102. In other words, in the embodiment of the disclosure, descriptions will be made by taking a case where read operations corresponding to a plurality of read commands entered from the host 102 are performed. In addition, in the embodiment of the disclosure, descriptions will be made by taking a case where: a plurality of erase commands are received from the host 102 for the memory blocks included in the memory device 150, memory blocks are checked corresponding to the erase commands, the data stored in the checked memory blocks are erased, map data are updated corresponding to the erased data, and the updated map data are stored in the plurality of memory blocks included in the memory device 150. Namely, in the embodiment of the disclosure, descriptions will be made by taking a case where erase operations corresponding to a plurality of erase commands received from the host 102 are performed.

Further, while, in the embodiment of the disclosure, it will be described below that the controller 130 performs command operations in the memory system 110, it is to be noted that, as described above, the processor 134 included in the controller 130 may perform command operations in the memory system 110, through, for example, an FTL (flash translation layer). Also, in the embodiment of the disclosure, the controller 130 programs and stores user data and metadata corresponding to write commands entered from the host 102, in arbitrary memory blocks among the plurality of memory blocks included in the memory device 150, reads user data and metadata corresponding to read commands received from the host 102, from arbitrary memory blocks among the plurality of memory blocks included in the memory device 150, and provides the read data to the host 102, or erases user data and metadata, corresponding to erase commands entered from the host 102, from arbitrary memory blocks among the plurality of memory blocks included in the memory device 150.

Metadata may include first map data including a logical/physical (L2P: logical to physical) information (hereinafter, referred to as a 'logical information') and second map data including a physical/logical (P2L: physical to logical) information (hereinafter, referred to as a 'physical information'), for data stored in memory blocks corresponding to a program operation. Also, the metadata may include an information on command data corresponding to a command received from the host 102, an information on a command operation corresponding to the command, an information on the memory blocks of the memory device 150 for which the command operation is to be performed, and an information on map data corresponding to the command operation. In other words, metadata may include all remaining information and data excluding user data corresponding to a command received from the host 102.

That is, in the embodiment of the disclosure, in the case where: the controller 130 receives a plurality of write commands from the host 102, program operations corresponding to the write commands are performed, and user data corresponding to the write commands are written and stored in empty memory blocks, open memory blocks or free memory blocks for which an erase operation has been performed, among the memory blocks of the memory device 150. Also, first map data, including an L2P map table or an L2P map list in which logical information as the mapping information between logical addresses and physical addresses for the user data stored in the memory blocks are recorded, and second map data, including a P2L map table or a P2L map list in which physical information as the mapping information between physical addresses and logical addresses for the memory blocks stored with the user data are recorded, are written and stored in empty memory blocks, open memory blocks or free memory blocks among the memory blocks of the memory device 150.

Here, in the case where write commands are entered from the host 102, the controller 130 writes and stores user data corresponding to the write commands in memory blocks. The controller 130 stores, in other memory blocks, metadata including first map data and second map data for the user data stored in the memory blocks. Particularly, corresponding to the data segments of the user data which are stored in the memory blocks of the memory device 150, the controller 130 generates and updates the L2P segments of first map data, and the P2L segments of second map data as the map segments of map data among the meta segments of metadata. The controller 130 stores the map segments in the memory blocks of the memory device 150. The map segments stored in the memory blocks of the memory device 150 are loaded in the memory 144 included in the controller 130 and are then updated.

Further, in the case where a plurality of read commands are received from the host 102, the controller 130 reads read data corresponding to the read commands, from the memory device 150, stores the read data in the buffers/caches included in the memory 144 of the controller 130. The controller 130 provides the data stored in the buffers/caches, to the host 102, by which read operations corresponding to the plurality of read commands are performed.

In addition, in the case where a plurality of erase commands are received from the host 102, the controller 130 checks memory blocks of the memory device 150 corresponding to the erase commands, and then, performs erase operations for the memory blocks.

When command operations corresponding to the plurality of commands received from the host 102 are performed while a background operation is performed, the controller 130 loads and stores data corresponding to the background operation, that is, metadata and user data, in the buffer/cache included in the memory 144 of the controller 130, and then stores the data, that is, the metadata and the user data, in the memory device 150. Herein, by the way of example but not limitation, the background operation may include a garbage collection operation or a read reclaim operation as a copy operation, a wear leveling operation as a swap operation or a map flush operation, For instance, for the background operation, the controller 130 may check metadata and user data corresponding to the background operation, in the memory blocks of the memory device 150, load and store the metadata and user data stored in certain memory blocks of the memory device 150, in the buffer/cache included in the memory 144 of the controller 130, and then store the metadata and user data, in certain other memory blocks of the memory device 150.

In the memory system in accordance with the embodiment of the disclosure, in the case of performing command operations as foreground operations, and a copy operation, a swap operation and a map flush operation as background operations, the controller 130 schedules queues corresponding to the foreground operations and the background operations, and allocates the scheduled queues to the memory 144 included in the controller 130 and the memory included in the host 102. In this regard, the controller 130 assigns identifiers (IDs) by respective operations for the foreground operations and the background operations to be performed in the memory device 150, and schedules queues corresponding to the operations assigned with the identifiers, respectively. In the memory system in accordance with the embodiment of the disclosure, identifiers are assigned not only by respective operations for the memory device 150 but also by functions for the memory device 150, and queues corresponding to the functions assigned with respective identifiers are scheduled.

In the memory system in accordance with the embodiment of the disclosure, the controller 130 manages the queues scheduled by the identifiers of respective functions and operations to be performed in the memory device 150. The controller 130 manages the queues scheduled by the identifiers of a foreground operation and a background operation to be performed in the memory device 150. In the memory system in accordance with the embodiment of the disclosure, after memory regions corresponding to the queues scheduled by identifiers are allocated to the memory 144 included in the controller 130 and the memory included in the host 102, the controller 130 manages addresses for the allocated memory regions. The controller 130 performs not only the foreground operation and the background operation but also respective functions and operations in the memory device 150, by using the scheduled queues.

Referring to FIG. 4, the controller 130 performs command operations corresponding to a plurality of commands entered from the host 102, for example, program operations corresponding to a plurality of write commands entered from the host 102. At this time, the controller 130 programs and stores user data corresponding to the write commands, in memory blocks of the memory device 150. Also, corresponding to the program operations with respect to the memory blocks, the controller 130 generates and updates metadata for the user data and stores the metadata in the memory blocks of the memory device 150.

The controller 130 generates and updates first map data and second map data which include information indicating that the user data are stored in pages included in the memory blocks of the memory device 150. That is, the controller 130 generates and updates L2P segments as the logical segments of the first map data and P2L segments as the physical segments of the second map data, and then stores the logical and physical segments in pages included in the memory blocks of the memory device 150.

For example, the controller 130 caches and buffers the user data corresponding to the write commands entered from the host 102, in a first buffer 510 included in the memory 144 of the controller 130. Particularly, after storing data segments 512 of the user data in the first buffer 510 worked as a data buffer/cache, the controller 130 stores the data segments 512 stored in the first buffer 510 in pages included in the memory blocks of the memory device 150. As the data segments 512 of the user data corresponding to the write commands received from the host 102 are programmed to and stored in the pages included in the memory blocks of the memory device 150, the controller 130 generates and updates the first map data and the second map data. The controller 130 stores the first and second map data in a second buffer 520 included in the memory 144 of the controller 130. Particularly, the controller 130 stores L2P segments 522 of the first map data and P2L segments 524 of the second map data for the user data, in the second buffer 520 as a map buffer/cache. As described above, the L2P segments 522 of the first map data and the P2L segments 524 of the second map data may be stored in the second buffer 520 of the memory 144 in the controller 130. A map list for the L2P segments 522 of the first map data and another map list for the P2L segments 524 of the second map data may be stored in the second buffer 520. The controller 130 stores the L2P segments 522 of the first map data and the P2L segments 524 of the second map data, which are stored in the second buffer 520, in pages included in the memory blocks of the memory device 150.

Moreover, the controller 130 performs command operations corresponding to a plurality of commands received from the host 102, for example, read operations corresponding to a plurality of read commands received from the host 102. Particularly, the controller 130 loads L2P segments 522 of first map data and P2L segments 524 of second map data as the map segments of user data corresponding to the read commands, in the second buffer 520, and checks the L2P segments 522 and the P2L segments 524. Then, the controller 130 reads the user data stored in pages of corresponding memory blocks among the memory blocks of the memory device 150, stores data segments 512 of the read user data in the first buffer 510, and then provides the data segments 512 to the host 102.

Furthermore, the controller 130 performs command operations corresponding to a plurality of commands entered from the host 102, for example, erase operations corresponding to a plurality of erase commands entered from the host 102. In particular, the controller 130 checks memory blocks corresponding to the erase commands among the memory blocks of the memory device 150 to carry out the erase operations for the checked memory blocks.

In the case of performing an operation of copying data or swapping data among the memory blocks included in the memory device 150, for example, a garbage collection operation, a read reclaim operation or a wear leveling operation, as a background operation, the controller 130 stores data segments 512 of corresponding user data, in the first buffer 510, loads map segments 522, 524 of map data corresponding to the user data, in the second buffer 520, and then performs the garbage collection operation, the read reclaim operation or the wear leveling operation. In the case of performing a map update operation and a map flush operation for metadata, e.g., map data, for the memory blocks of the memory device 150 as a background operation, the controller 130 loads the corresponding map segments 522, 524 in the second buffer 520, and then performs the map update operation and the map flush operation.

As aforementioned, in the case of performing functions and operations including a foreground operation and a background operation for the memory device 150, the controller 130 assigns identifiers by the functions and operations to be performed for the memory device 150. The controller 130 schedules queues respectively corresponding to the functions and operations assigned with the identifiers, respectively. The controller 130 allocates memory regions corresponding to the respective queues, to the memory 144 included in the controller 130 and the memory included in the host 102. The controller 130 manages the identifiers assigned to the respective functions and operations, the queues scheduled for the respective identifiers and the memory regions allocated to the memory 144 of the controller 130 and the memory of the host 102 corresponding to the queues, respectively. The controller 130 performs the functions and operations for the memory device 150, through the memory regions allocated to the memory 144 of the controller 130 and the memory of the host 102.

Referring to FIG. 5, the memory device 150 includes a plurality of memory dies, for example, a memory die 0, a memory die 1, a memory die 2 and a memory die 3, and each of the memory dies includes a plurality of planes, for example, a plane 0, a plane 1, a plane 2 and a plane 3. The respective planes in the memory dies included in the memory device 150 include a plurality of memory blocks, for example, N number of blocks Block0, Block1, . . . , BlockN−1 each including a plurality of pages, for example, $2^M$ number of pages, as described above with reference to FIG. 3. Moreover, the memory device 150 includes a plurality of buffers corresponding to the respective memory dies, for example, a buffer 0 corresponding to the memory die 0, a buffer 1 corresponding to the memory die 1, a buffer 2 corresponding to the memory die 2 and a buffer 3 corresponding to the memory die 3.

In the case of performing command operations corresponding to a plurality of commands received from the host 102, data corresponding to the command operations are stored in the buffers included in the memory device 150. For example, in the case of performing program operations, data corresponding to the program operations are stored in the buffers, and are then stored in the pages included in the memory blocks of the memory dies. In the case of performing read operations, data corresponding to the read operations are read from the pages included in the memory blocks of the memory dies, are stored in the buffers, and are then provided to the host 102 through the controller 130.

In the embodiment of the disclosure, while it will be described below that the buffers included in the memory device 150 exist outside the respective corresponding memory dies, it is to be noted that the buffers may exist inside the respective corresponding memory dies, and it is to be noted that the buffers may correspond to the respective planes or the respective memory blocks in the respective memory dies. Further, in the embodiment of the disclosure, while it will be described below that the buffers included in the memory device 150 are the plurality of page buffers 322, 324 and 326 included in the memory device 150 as described above with reference to FIG. 3, it is to be noted that the buffers may be a plurality of caches or a plurality of registers included in the memory device 150.

Also, the plurality of memory blocks included in the memory device 150 may be grouped into a plurality of super memory blocks, and command operations may be performed in the plurality of super memory blocks. Each of the super memory blocks may include a plurality of memory blocks, for example, memory blocks included in a first memory block group and a second memory block group. In this regard, in the case where the first memory block group is included in the first plane of a certain first memory die, the second memory block group may be included in the first plane of the first memory die, be included in the second plane of the first memory die or be included in the planes of a second memory die.

In an embodiment of the disclosure, a data processing system may include plural memory systems. Each of the plural memory systems 110 can include the controller 130 and the memory device 150. In the data processing system, one of the plural memory systems 110 can be a master and the others can be a slave. The master may be determined based on contention between the plural memory systems 110. When a plurality of commands is delivered from the host 102 in the data processing system, the master can determine a destination of each command based at least on statuses of channels or buses. For example, a first memory system can be determined as a master memory system among a plurality of memory systems, corresponding to information delivered from the plurality of memory systems.

If the first memory system is determined as the master memory system, the remaining memory systems are considered slave memory systems. A controller of the master memory system can check statuses of a plurality of channels (or ways, buses) coupled to a plurality of memory systems, to select which memory system handles commands or data delivered from the host 102. In an embodiment, a master can be dynamically determined among the plural memory systems. In another embodiment, a master memory system may be changed with one of other slave memory systems periodically or according to an event.

Hereinafter, a method and apparatus for transferring data in the memory system 110 including the memory system 150 and the controller 130 described above will be described in more detail. As the amount of data stored in the memory system 110 becomes larger, the memory system 110 may be required to read or store large amounts of data at a time. However, a read time for reading a data stored in the memory device 150 or a program/write time for writing a data in the memory device 150 may be generally longer than a handling time for the controller 130 to process data or a data transmission time between the controller 130 and the memory system 150. For example, the read time might be twice that of the handling time. Since the read time or the program time is relatively far longer than the handling time or the data transmission time, a procedure or a process for delivering data in the memory system 110 may affect performance of the memory system 110, e.g., an operation speed, and/or structure of the memory system 110 such as a buffer size.

Figure 6:
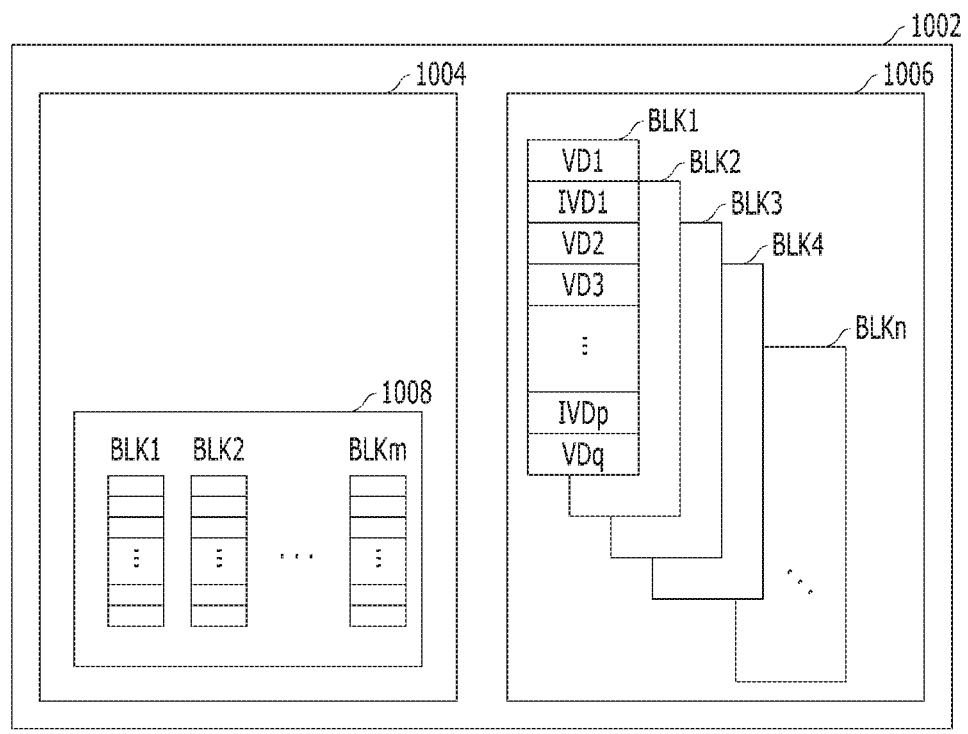
FIG. 6 is a diagram illustrating a memory system including a controller and a non-volatile memory device in accordance with an embodiment of the disclosure.

In FIG. 6, a memory system 1002 including a controller 1004 and a non-volatile memory device 1006 in accordance with an embodiment of the disclosure is described.

Referring to FIG. 6, the memory system 1002 can include the controller 1004 and the non-volatile memory device 1006. The controller 1004 can include a memory 1008. In accordance with an embodiment, the memory 1008 may be included in the memory 144 described in FIGS. 1 to 3. For example, the memory 1008 may be implemented as a DRAM, SRAM, or the like, which is a type of volatile memory device. When the memory 1008 has a structure different from that of the nonvolatile storage device 1006, blocks BLK1, BLK2, . . . , BLKm (BLK1 to BLKm) included in the memory 1008 and data stored therein are those visualized as the structure and stored data of the nonvolatile memory device 1006.

A non-volatile memory device 1006 having a characteristic in which stored data is maintained even when power is not supplied includes a plurality of blocks BLK1, BLK2, BLK3, BLK4, . . . , BLKn (BLK1 to BLKn) capable of storing data. Herein, n is an integer of 5 or greater. The controller 1004 can support or enhance safety and speed of operations performed within the non-volatile memory device 1006 that inputs and outputs data. For example, the non-volatile memory device 1006 may store data inputted from the controller 1004 during a write operation. In a read operation, the non-volatile memory device 1006 can output the stored data to the controller 1004. The controller 1004 may erase the data stored in the nonvolatile memory device 1006 through an erase operation.

Each of the plurality of blocks BLK1 to BLKn capable of storing data in the nonvolatile memory device 1006 can include a plurality of pages. Also, each page may include a plurality of memory cells coupled via at least one word-line (WL).

In order to more easily understand an embodiment of the disclosure, the following would be assumed. Data stored in each page can be classified into valid data (VD) or invalid data (IVD). The valid data can include a case where the last updated value of the data stored in the page is recorded and a physical address of the page is mapped with a logical address recognizable by the host engaged with the memory system 1002 through the map table. The invalid data may include data having an old value, e.g., a value before being updated in the page so that a physical address of the page is not matched in the map table.

Each page may store data physically. But when it is determined whether physically stored data in each page is valid or invalid, then plural valid data VD1, VD2, VD3, . . . , VDq (VD1 to VDq) and plural invalid data IVD1, . . . , IVDq (IVD1 to IVDq) may be represented. Here, 'q' and 'p' are integers of 2 or more. On the other hand, a block where all pages are empty and there is no data can be considered a free block. A free block indicates that new data can be stored in memory cells of each page.

The controller 1004 may access data stored in the non-volatile memory device 1006 to read accessed data and load read data to the memory 1008 of the controller 1004, as needed or requested. For example, when frequently used data among the data of the nonvolatile memory device 1006 is stored in the memory 1008 of the controller 1004, an operation of outputting the data stored in the controller 1006 can be completed faster than another operation of accessing, reading and outputting the data stored in the nonvolatile memory device 1006. That is, the data stored in the memory 1008 can be outputted to an external device without accessing and reading from the nonvolatile memory device 1006. Particularly, when the controller 1004 uses the data recently processed by the controller 1004 and stored in the memory 1008, the data can be outputted faster than the data read from the nonvolatile memory device 1006.

In an embodiment of the disclosure, the controller 1004 can search for valid data in the non-volatile memory device 1006, move the searched data to available free blocks of the non-volatile memory device, and update the map table regarding the moved data. The valid data of the victim block may become invalid after the move into the free block. When all pages in the victim block of the non-volatile memory device 1005 contain invalid data, the controller 1004 may erase that victim block. The controller 1004 may measure a time spent on the garbage collection operation of the searching, moving, updating, and deleting data within the non-volatile memory device 1006. Furthermore, the controller 1004 may compare the measured time with a threshold time to determine whether to repeat the garbage collection operation.

The memory 1008 in the controller 1004 is a storage device included in order to support operations performed by the controller 1004 and enhance operation efficiency. Depending on an embodiment, the memory 1008 may be arranged external to the controller 1004. The memory 1008, on the other hand, may include a volatile memory device which may lose all stored data when the power is turned off, unlike the non-volatile memory device 1006. By way of example but not limitation, the memory system 1002 may be a solid state drive (SSD). The non-volatile memory device 1006 may include a NAND flash memory or a NOR flash memory, and the memory 1008 may include DRAM or SRAM.

In accordance with an embodiment, the memory 1008 may include a plurality of blocks, a plurality of memory cells, etc. for storing data. Depending on an embodiment, the memory 1008 may have a similar structure with the non-volatile memory device 1006, or the memory 1008 may have a different structure from the non-volatile memory device 1006. For example, the memory 1008 may include a plurality of blocks BLK1 to BLKm capable of storing data, each block including a plurality of pages, each including a plurality of memory cells connected to at least one word-line (WL). Here, 'm' is a natural number of 2 or more.

In accordance with an embodiment, a block in memory 1008 may have the same storage capacity as a memory block in non-volatile memory device 1006, or may have different storage capacity. The memory 1008 has a total storage capacity smaller than that of the nonvolatile memory device 1006 and has a volatile characteristic. Therefore, the memory 1008 can be provided for supporting an operation speed for handling or processing the data in the controller 1004 rather than storing data for a long time or permanently.

In an embodiment of the disclosure, when the controller 1004 searches for valid data stored in the non-volatile memory device 1006 in units of a predetermined range, the controller 1004 uses the memory 1008 to load searched valid data. For example, the controller 1004 can search valid data stored in a predetermined range of the non-volatile memory device 1004, then move the searched valid data into a free block in the non-volatile memory device 1006. The searched valid data may be stored in the memory 1008 until a map table regarding the moved data is updated.

Hereinafter, except for a storage capacity required for data to be basically loaded in the memory 1008 for operations of the memory system 1002, it is limited to a storage capacity allocated for searched valid data loaded from the nonvolatile memory device 1004. Therefore, it is assumed that the memory 1008 is empty in the initial state before the operation of the controller 1004 in accordance with an embodiment of the disclosure is begun.

Figure 7:
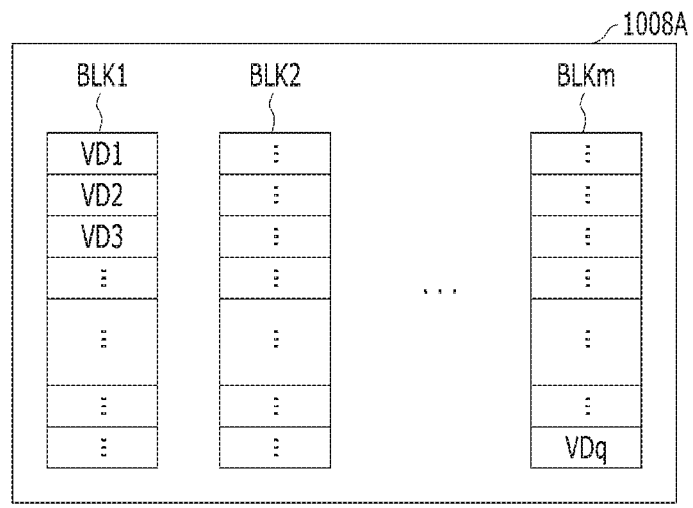
FIG. 7 is a diagram describing accessing data in a page unit and storing accessed data in a memory of a controller in accordance with an embodiment of the disclosure.

In FIG. 7, an operation method for accessing data in a page unit and storing an accessed data in a memory within a controller in a memory system in accordance with an embodiment of the disclosure is described.

Referring to FIG. 7, a memory 1008A may have a substantially similar structure with the memory 1008 shown in FIG. 6. The memory 1008A can be an embodiment in which valid data for the garbage collection is repeatedly searched in every predetermined range.

In accordance with an embodiment, to reduce a time consumed for garbage collection, the controller 1004 searches a predetermined amount of data for valid data. The predetermined amount of data may be determined according to a storage capacity of the memory 1008A within the controller 1004. For example, in a case when a storage capacity of the non-volatile memory device 1006 is 128 G and a storage capacity of the memory 1008A is 2 G, the predetermined amount of data to be searched may be determined to be smaller than 2 G. If the predetermined amount of data to be searched is 1 G, the controller 1004 searches 1 G as the predetermined amount of data for valid data during each garbage collection operation. Therefore, in accordance with an embodiment of the present invention, the garbage collection operation may be ideally performed 128 times to search all of the data stored in the 128 G storage the nonvolatile memory device 1006.

In accordance with another embodiment, the controller 1004 may search for valid data in the non-volatile memory device 1006 until the memory 1008A is full of the searched valid data. The controller 1004 can access data of the nonvolatile memory device 1006 on a page-by-page basis and load only valid data in the memory 1008A. The controller 1004 sequentially reads only the valid data VD1 to VDq on a page basis from a specific position in the non-volatile memory device 1006 and stores the valid data VD1 to VDq in the memory 1008A. When the memory 1008A is full of the searched valid data (i.e., the memory 1008A is fully occupied), the valid data search can be terminated. Here, 'q' is a natural number of 2 or more.

Like the memory 1008 described in FIG. 6, the controller 1004 sequentially searches for valid data stored in a plurality of blocks of the non-volatile memory device 1006 and stores the valid data in the memory 1008A until the memory 1008A is full of valid data. The stored valid data may be sorted or aligned to correspond to a plurality of available free blocks BLK1 to BLKm in the non-volatile memory device 1006. Here, 'm' is a natural number of 2 or more. As shown in FIG. 7, there are 'q' number of blank pages, which are available for storing valid data, among pages included in each of the blocks BLK1 to BLKm of the memory 1008A. The controller 1004 finds 'q' pieces of valid data from the non-volatile memory device 1006 and stores the valid data in the memory 1008A.

In accordance with an embodiment, blocks BLK1 to BLKm in memory 1008A may be types of memory areas logically divided. For example, when the memory 1008A is structured like the non-volatile memory device 1006, plural blocks of the memory 1008A may correspond to those of the non-volatile memory device 1006. When the memory 1008A and the nonvolatile memory device 1006 have different structures, an available memory area for storing valid data in the memory 1008A can be logically divided to correspond to the plurality of blocks BLK1 to BLKm of the nonvolatile memory device 1006.

In accordance with an embodiment, it is also possible for the controller 1004 to search for valid data in the predetermined range of the non-volatile memory device 1006 in any order without any rules. Also, the searched valid data is loaded in the memory 1008A in an arbitrary order.

An embodiment of the disclosure might show that the controller 1004 can find or search for valid data in every predetermined range of the nonvolatile memory device 1006. However, a search order or a storage order for valid data might be varied. For example, the order the controller 1004 finds valid data within the predetermined range or loads searched valid data in the memory 1008A can be different depending upon on-demand design or configuration of the memory system. Therefore, the search order and the storage order may be determined by any method, and the embodiment is not limited thereto.

Figure 8:
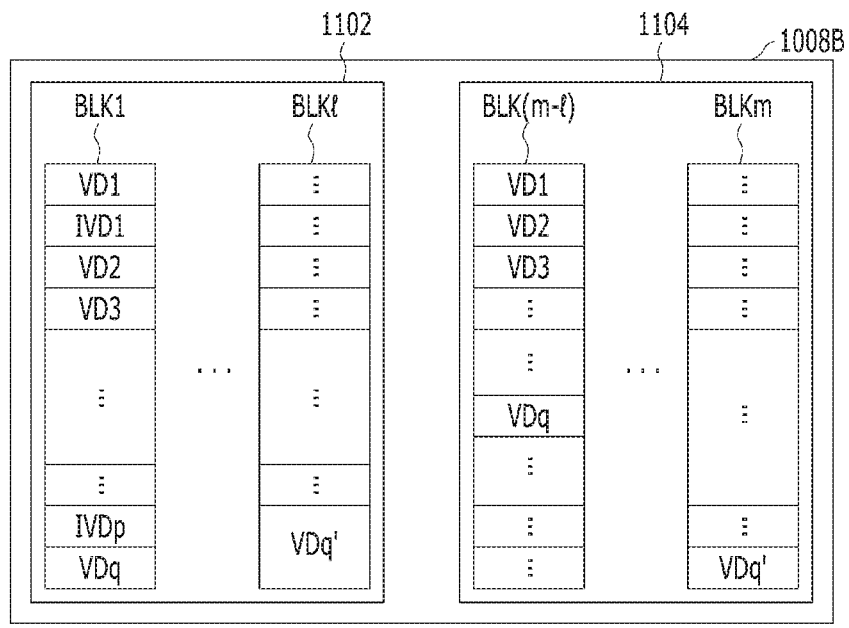
FIG. 8 is a diagram illustrating accessing of data in block unit and storing of accessed data in a memory of a controller in accordance with an embodiment of the disclosure.

In FIG. 8, in a memory system in accordance with an embodiment of the disclosure, a controller may access a nonvolatile memory device by a block basis, and load accessed data in a memory within the controller.

Referring to FIG. 8, a memory 1008B may have the same structure as the memory 1008 shown in FIG. 6. The memory 1008B may be an embodiment in which valid data is searched for within each predetermined range for garbage collection.

The memory 1008B can include a data area 1102 in which the controller 1004 loads data of a predetermined amount from the nonvolatile memory device 1006, which are accessed on a block-by-block basis, and a valid data area 1104 for storing valid data selected from the data area 1102. The controller 1004 can check validity of the data loaded in the data area 1102.

Referring to FIG. 8, in order to reduce a time spent on garbage collection, the controller 1004 searches a predetermined amount of data for valid data, and does not search all of the data, nor all of the areas, of the nonvolatile memory device 1006 during each garbage collection operation. The predetermined amount of data may correspond to a storage capacity of the data area 1102.

The controller 1004 may repeatedly load the predetermined amount of data from the non-volatile memory device 1006 into the data area 1102 on a block-by-block basis until the valid data area 1104 is full of the valid data before the valid data stored in the valid data area 1104 are programmed into free blocks of the non-volatiles memory device 1006. In FIG. 7, the controller 1004 accesses the predetermined amount of data within the non-volatile memory device 1006 on a page-by-page basis. However, in the embodiment shown in FIG. 8, the controller 1004 can access the predetermined amount of data on a block-by-block basis, and then the controller 1004 can select valid data from the data accessed on the block-by-block basis. Since the controller 1004 can load the predetermined amount of data from the memory device 1006 on the block-by-block basis, the predetermined amount of loaded data in the data area 1002 may include valid data VD1 to VDq' and invalid data IVD1 to IVDp. The controller 1004 selects only the valid data VD1 to VDq' from the data area 1102 and stores the selected valid data in the valid data area 1104. Here, 'q,' 'q" and 'p' may be integers of 2 or more.

In FIG. 8, the memory 1008B can be split into the data area 1102 and the valid data area 1104. The data area 1102 may include a plurality of logical blocks BLK1 to BLKl each corresponding to each block of the nonvolatile memory device 1006. The valid data area 1104 may include a plurality of logical blocks BLK (m−l) to BLKm each corresponding to each free block of the nonvolatile memory device 1006. Here, 'l' is a natural number larger than 2 and less than 'm,' and 'm' is a natural number, which can correspond to a value of dividing a storage capacity of the memory 1008B by a size of each block in the nonvolatile memory device 1006.

In the memory 1008B, the data area 1102 may be larger than the valid data area 1104. For example, the data area 1102 may have a size of 1.5 times, 2 times, 3 times or 4 times larger than the valid data area 1104. However, sizes allocated to the data area 1102 and the valid data area 1104 in the memory 1008B in accordance with the embodiment can be dynamically determined. This is because a ratio of the valid data among the predetermined amount of data from the nonvolatile memory device 1006 can be varied continuously. By way of example but not limitation, the sizes for the data area 1102 and the valid data area 1104 in the memory 1008B can be dynamically determined based at least on information such as map data, data characteristics, data patterns, and the like.

A method and a sequence for reading data from the data area 1102 then selecting and copying valid data to the valid data area 1104 may be variously implemented. In accordance with an embodiment, when the data area 1102 is allocated, data from a single block of the nonvolatile memory device 1006 may be loaded, and the controller 1004 searches for valid data in the loaded data to be copied into the valid data area 1104. In another embodiment, when the data area 1102 is set, the controller accesses a predetermined number of blocks of the nonvolatile memory device 1006, and stores accessed data from the predetermined number of blocks in the data area 1102. Then, the controller 1004 finds valid data in stored data to be copied into the valid data area 1104. In another embodiment, valid data may be selected and copied to the valid data area 1104 after the data area 1102 is fully filled with the predetermined amount of data loaded from the nonvolatile memory device 1006.

Figure 9:
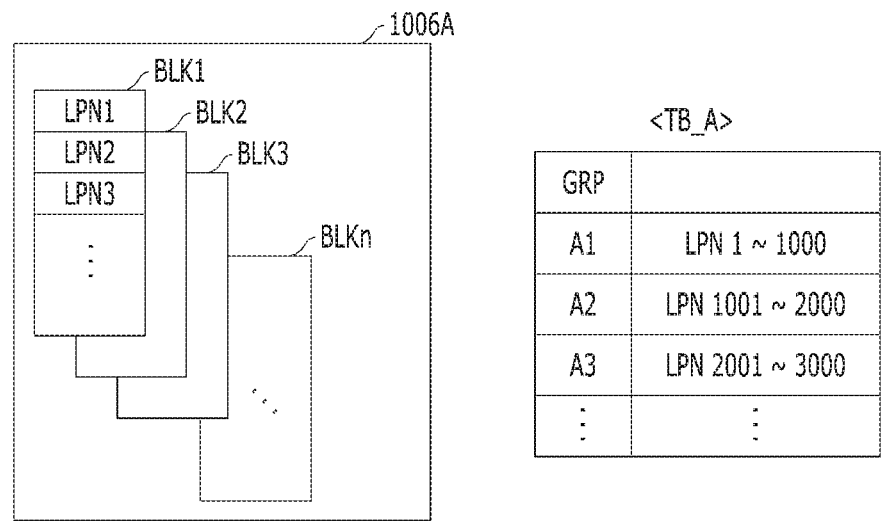
FIG. 9 is a diagram describing data in a non-volatile memory device which is divided into data units used by a host in accordance with an embodiment of the disclosure.

FIG. 9 is a view describing a non-volatile memory device in accordance with an embodiment of the disclosure. In this example, data for garbage collection may be collected or sorted based on a logical address used by a host.

Referring to FIG. 9, the non-volatile memory device 1006A may have the same structure as the non-volatile memory device 1006 shown in FIG. 6. The non-volatile memory device 1006A is an embodiment of a memory system including a controller which can perform garbage collection or wear levelling in a predetermined range basis of the non-volatile memory device 1006A. When voluminous data is stored sequentially, this method can be more effective to search for valid data.

Referring to FIG. 9, the controller 1004 searches a predetermined amount of data in the nonvolatile memory device 1006 for valid data to reduce time consumed for garbage collection or wear levelling, as described above. The predetermined amount can be determined based at least on a data unit used by the host engaged with the memory system.

The data unit can be determined in various ways. By the way of example but not limitation, a data area in the nonvolatile memory device 1006A, which is recognized by the host, can be divided into N (2 or more natural numbers) to determine the data unit. In an embodiment of the disclosure, a logical page number (LPN) or a logical page address (LPA) can be used as a tool for determining the data unit used by a host.

A logical address such as the logical page number (LPN) or the logical block address (LBA) is different from a physical address such as a physical page number (PPN) or a physical block address (PBA). For example, a physical address can refer to an actual page serial number of the non-volatile memory device 1006A or an actual address which can indicate a specific page in the non-volatile memory device 1006A. However, the logical address is used by the host for indicating a data or distinguishing a data from another one stored in the non-volatile memory device 1006A. Generally, the host does not know which data is stored in a specific location of the non-volatile memory device 1006A. Thus, the controller 1004 can match the logical address used by the host with the physical address used in the non-volatile memory device 1006A (mapping process). The controller 1004 can generate and store a mapping table or mapping information for map conversion.

Figure 10:
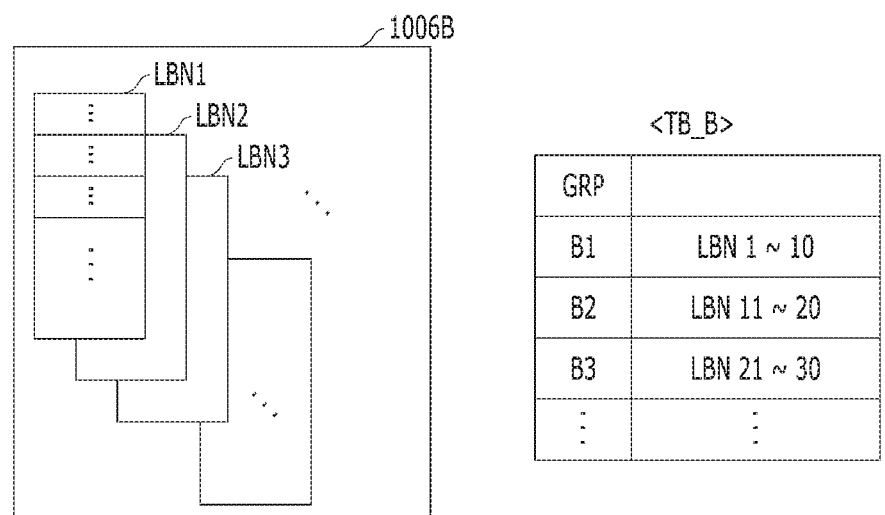
FIG. 10 is a diagram describing data in a non-volatile memory device which is divided into data units used by a host in accordance with an embodiment of the disclosure.

On the other hand, in accordance with an embodiment, a plurality of blocks BLK1 to BLKn of the nonvolatile memory device 1006 shown in FIG. 7 can be considered as a plurality of blocks BLK1 to BLKn of the nonvolatile memory device 1006B shown in FIG. 10. Here, the order of the logical page numbers may not be specifically defined, and the user can arbitrarily determine the order of the logical page numbers. That is, the embodiment is not limited to the concept of the logical page number, but is characterized in that the nonvolatile memory device 1006A can be divided by a predetermined range based on the logical address for searching for valid data to perform the garbage collection or the wear levelling.

When the controller 1004 divides a data area of the nonvolatile memory device 1006A into plural predetermined amounts based on logical addresses, the controller 1004 may continuously search a relatively small size of data compared with searching the entire memory capacity of the memory 1008. In such a case, the controller 1004 may perform an excessive amount of repeated commands which increases system overhead. Since this may be an ineffective way, the embodiment of the disclosure can consider grouping and searching using a first table TB_A shown in FIG. 9.

In accordance with an embodiment of the disclosure, the non-volatile memory device 1006A comprises a plurality of blocks BLK1 to BLKn each including a plurality of pages LPN1, LPN2, LPN3, . . . .

In accordance with an embodiment, the nonvolatile memory device 1006A is divided into some parts or groups based on logical addresses. For example, as in the first table TB_A of FIG. 9, the first group A1 includes logical page numbers 1 to 1000, the second group A2 includes logical page numbers 1001 to 2000, and the third group A3 includes logical page numbers 2001 to 3000, respectively. For grouping, various embodiments can be made based on different ranges of logical page numbers, such as 100 or 1000, to determine each range according to system configuration or user's selection.

As described above, valid data is searched for in units of a predetermined amount (i.e., the size of the respective logical page groups A1, A2, A3, . . . ) obtained by dividing the non-volatile memory device 1006A based on a logical page number or a grouped range. The controller 1004 searches for valid data in a data area of the nonvolatile memory device 1006A, which corresponds to a predetermined number of logical page numbers.

The presence or absence of valid data within the stored data corresponding to each logical page number can be determined in advance. The controller 1004 may search for valid data within the predetermined amount of stored data corresponding to a predetermined number of logical page addresses in the non-volatile memory device 1006A.

As another example, the controller 1004 may check an unused logical address, which is not matched with valid data independently, in a data area corresponding to a predetermined logical page numbers in the non-volatile memory device 1006A. For example, the controller 1004 checks a validity of data corresponding to the logical address in an order to search for valid data. When a count of valid logic page numbers checked is larger than a predetermined number, the valid data search can be stopped.

FIG. 10 is a view of a nonvolatile memory device in accordance with an embodiment of the disclosure. In this example, a data region of the nonvolatile memory device may be divided into groups or parts based on a data unit used by a host.

Referring to FIG. 10, the non-volatile memory device 1006B may be identical in structure to the non-volatile memory device 1006 of FIG. 6. The non-volatile memory device 1006B is an embodiment of a memory system including a controller which can perform garbage collection or wear levelling in a predetermined range basis of the non-volatile memory device 1006B.

Referring to FIG. 10, the controller 1004 can search a predetermined amount of data in the nonvolatile memory device 1006 for valid data to reduce time consumed for garbage collection or wear levelling, as described above. The garbage collection or the wear levelling can be cut shorter. Thus, it can be avoided that a memory system spends a long time on performing garbage collection or wear levelling. The predetermined amount can be represented by a data unit used by the host engaged with the memory system.

The data unit can be determined in various ways. By way of example but not limitation, a data area in the nonvolatile memory device 1006A, which is recognized by the host, can be divided into N (2 or more natural numbers) to determine the data unit. In an embodiment of the disclosure, a logical block number (LBN) or a logical block address (LBA) can be used as a tool for determining the data unit used by a host.

The logical block address (LBA) is used in a logical block addressing (LBA) method, and may have a format or a structure used to specify a location of a data block recorded in a storage device interlocked with a computing device. For example, in the case of a conventional hard disk, an addressing method indicating a physical structure included in a hard disk, such as a cylinder, a head, and a sector (a Cylinder-Head-Sector, CHS) was used. However, the address system corresponding to the physical structure of the disk has reached the limit as the storage capacity of the hard disk increases. In such a large-capacity storage device, the address can be specified in a manner that the sectors are arranged in a logical sequence so that the sectors are numbered (for example, in order from 0), which is determined regardless of a physical structure of the hard disk.

Herein, the logical block number (LBN) or the logical block address (LBA) may be considered a logical address. The logical address is different from a physical address such as a physical page number (PPN) or a physical block address (PBA). For example, a physical address can refer to an actual page serial number of the non-volatile memory device 1006A or an actual address which can indicate a specific page in the non-volatile memory device 1006A. However, the logical address is used by the host for indicating a data or distinguishing a data from another one stored in the non-volatile memory device 1006A. Generally, the host does not know which data is stored in a specific location of the non-volatile memory device 1006A. Thus, the controller 1004 can match the logical address used by the host with the physical address used in the non-volatile memory device 1006A (mapping process). The controller 1004 can generate and store a mapping table or mapping information for map conversion.

For example, a super block may be used. A predetermined range for finding valid data in the non-volatile memory device 1006A can be determined based at least on a data size corresponding to the super block. In accordance with an embodiment, the super block may be set by grouping a plurality of consecutive or parallel blocks, or may be set by grouping a plurality of random blocks. The nonvolatile memory device 1006B can be divided into plural super blocks, which may be controlled by the host, and these super blocks can be used as a predetermined range in which the controller searches for valid data to perform garbage collection or wear levelling.

On the other hand, in accordance with an embodiment, a plurality of blocks BLK1 to BLKn of the nonvolatile memory device 1006 shown in FIG. 6 are divided into a plurality of logical blocks LBN1, LBN2, LBN3, . . . shown in FIG. 10. Herein, an order between the logical block numbers is not specifically defined, and a user can arbitrarily determine the order of the logical block numbers. That is, this embodiment is not limited to the concept of the logical block number. The controller searching data in the non-volatile memory device 1006B can split a data region of the non-volatile memory device 1006B into plural predetermined ranges to find valid data to limit a search scope for garbage collection or wear levelling.

When the controller 1004 divides the data of the non-volatile memory device 1006B into plural groups on a logical-block basis, the controller 1004 continuously searches a relatively small size as compared with the entire memory capacity of the memory 1008. In such a case, the controller 1004 may perform an excessive amount of the same command which may cause a system load. Since this may be an inefficient instruction, the embodiment of the disclosure considers grouping and searching as in the second table TB_B in FIG. 10.

In accordance with an embodiment of the disclosure, the non-volatile memory device 1006B includes a plurality of blocks LBN1, LBN2, LBN3, . . . each including a plurality of pages.

In accordance with an embodiment, the nonvolatile memory device 1006B may be grouped or divided into logical block number units. For example, as in the second table TB_B of FIG. 10, the first group B1 includes logical block numbers 1 to 10, the second group B2 includes logical block numbers 11 to 20, and the third group B3 is logical block numbers 21 to 30, respectively. For grouping, various embodiments can be made based on different ranges of logical block numbers, such as 10 or 20, to determine each range according to a system configuration or a user's selection.

The valid data can be searched for in units of a predetermined amount (i.e., the size of the respective logical block groups B1, B2, B3, . . . ) established by dividing the nonvolatile memory device 1006B by a logic block number or a grouped range. That is, the controller 1004 searches for valid data in every range of the non-volatile memory device 1006B, which corresponds to a predetermined number of the logical block numbers.

The presence or absence of valid data within the stored data corresponding to each logical block number can be determined in advance. The controller 1004 may search for valid data within the predetermined amount of stored data corresponding to a predetermined number of logical block addresses in the nonvolatile memory device 10066.

As another example, the controller 1004 may check an unused logical address, which is not matched with valid data independently, in a data area corresponding to a predetermined logical block numbers in the non-volatile memory device 10066. For example, the controller 1004 checks a validity of data corresponding to the logical address in an order to search for valid data. When a count of valid logic block numbers checked is larger than a predetermined number, the valid data search can be stopped.

In FIG. 11, a memory system in accordance with an embodiment of the disclosure is illustrated. The controller can find valid data in a non-volatile memory device which can be logically divided based on a size basis of map data.

Referring to FIG. 11, the non-volatile memory device 1006C may be identical in structure to the non-volatile memory device 1006 shown in FIG. 6. The non-volatile memory device 1006C describes an embodiment of a memory system including a controller which can perform garbage collection or wear levelling in a predetermined range basis of the non-volatile memory device 1006C.

In FIG. 11, as above described, the controller 1004 can search for valid data in a predetermined range of the non-volatile memory device 1006 to cut time spent on garbage collection or wear levelling. The predetermined range may be determined to correspond to a size of the map data.

The predetermined range can be set by dividing the size of map data stored in at least one block BLK1, BLK2, BLK3 of the nonvolatile memory device 1006C by M (two or lager natural number). The map data corresponding to data stored in the nonvolatile memory device 1006C can be split into M number of equal parts, as distinguished from a method setting the range determined based on the data unit used by the host.

The locations where the map data is stored in the plurality of blocks BLK1, BLK2, BLK3, . . . of the nonvolatile memory device 1006C may include pages PG1, PG2, PG3, PG4, . . . of a first block BLK1, pages PG1, PG2, PG3, PG4, . . . of a second block BLK2, and pages PG1, PG2, PG3, PG4 . . . of a third block BLK3.

By way of example but not limitation, some pages of the blocks (i.e., map data of a predetermined size) may be grouped as shown in a third table TB_C shown in FIG. 11, as follows: a first group C1, (BLK1, PG101-200), (BLK2, PG101-200), . . . , a second group C2, (BLK1, PG101-200), (BLK2, PG101-200), . . . , and a third group C3, (BLK1, PG201 to 300), (BLK2, PG201 to 300), . . . of nonvolatile memory device 1006C. In addition, the controller can group other blocks or other pages into plural groups. The sequence of pages or blocks are not limited. The controller can arbitrarily group plural pages of each block into several parts regardless of an order between pages or blocks.

As another example, the blocks may be grouped based on a block-by-block basis (i.e., map data of a predetermined size) as shown in the fourth table TB_D of FIG. 11, as follows. For example, a first group D1 includes first three blocks BLK1 to BLK3, a second group D2 includes second three blocks BLK4 to BLK6, a third group D3 includes third three blocks BLK7 to BLK9. Each group can include plural blocks which are not sequenced. The controller can assign a same number of blocks to each group, but block numbers assigned for each group can be arbitrarily determined.

In addition, there may be an embodiment in which a plurality of pages is grouped. In an embodiment of the disclosure, the example of grouping plural pages or plural blocks according to the size of the map data is shown. Further, a user can arbitrarily assign and group positions on the premise that the size of the map data is the same for each group.

Figure 12:
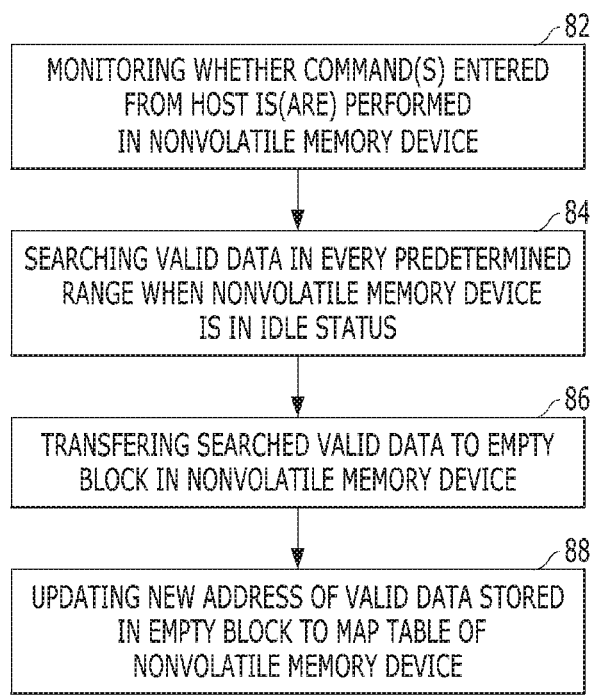
FIG. 12 is a flowchart illustrating an operation of a memory system including a memory device and a controller in accordance with embodiment of the disclosure.

FIG. 12 illustrates an operating method for the memory system 1002 in accordance with an embodiment of the disclosure. The memory system 1002 can collect valid data scattered in the memory device 1006 and move it to another position in order to secure the storage space of the large amount of data or to carry out the wear leveling of the nonvolatile memory device 1006. To this end, a method may be required to increase the number of blocks (erase blocks) from which data can be erased among the plurality of blocks of the non-volatile memory device 1006.

Referring to FIG. 12, a method for operating the memory system 1002 can include monitoring whether command(s) entered from a host is(are) performed in the nonvolatile memory device 1006 (step 82), searching for valid data in a predetermined amount of data stored in the nonvolatile memory device 1006 when the nonvolatile memory device 1006 is in an idle status (step 84), and programming searched valid data to at least one empty block in the nonvolatile memory device 1006 (step 86). Here, the empty block can be understood to be a free block. By searching for valid data in a predetermined amount of data stored in the nonvolatile memory device 1006 in the idle state of the nonvolatile memory device 1006, it is possible to reduce the time spent on searching for valid data. Accordingly, even if a command is newly entered from the host and the idle state is released, it is not necessary to stop or halt the background operation (i.e., the process of FIG. 12) because a stand-by time for performing an operation in response to the command due to the background operation would not be long. Thus, the already searched valid data can be moved to the free block and a limited range of valid data searched during a single background operation in the idle state can increase the efficiency and reliability of the memory system 1002.

The method of operating the memory system 1002 may further include updating a new address of valid data moved in the empty block to a map table of the nonvolatile memory device 1006 (step 88). After moving the valid data to a new location (block) and then updating the map table, the background operation such as garbage collection or wear levelling can be successfully completed. Such background operation of the reduced searching area for the valid data may be repeated on different searching areas during each idle state of the memory device 1006 such that plural times of the background operation can cover all of the storage area within the memory device 1006.

Meanwhile, although not shown, the method of operating the memory system measures or monitors the time from when the valid data is searched for (step 84) to when the address of the valid data is last updated (step 88). When the measured time is less than a predetermined threshold time, the controller 1004 can search for a valid area in another predetermined range. However, the controller 1004 can terminate another search process when the measured time is greater than or equal to the predetermined threshold time. The operation of the memory system 1002 to search for valid data by itself does not need to interrupt or prevent an operation according to a command that the host requests or requires to the memory system 1002. Therefore, the operation of the memory system 1002 to search for valid data by itself needs to be performed within a predetermined operation time or operation interval. Here, the operation time or operation interval may be a predetermined value. However, in accordance with an embodiment, the operation time or operation interval may be determined dynamically corresponding to the operation pattern requested by the host to which the memory system cooperates.

On the other hand, although not shown, the method of operation of the memory system may further include erasing data of all pages in the victim block of the non-volatile memory device when the data stored in all pages of the victim block do not link with an address included in the map table as a result of steps 84 to 88. For example, when there is no data linked to the address of the map table as a result of steps 84 to 88, it can be determined that all of the data of that victim block are invalid. In this case, all of the data in the victim block can be erased to obtain an empty block or a free block.

Figure 13:
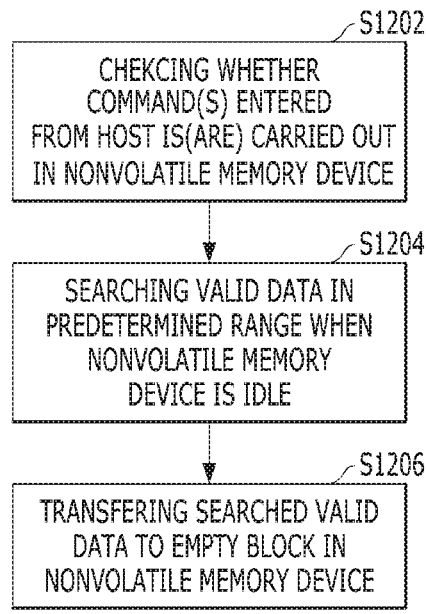
FIG. 13 is a flowchart illustrating a garbage collection operation in accordance with an embodiment of the disclosure.

FIG. 13 illustrates processes for garbage collection in accordance with an embodiment of the disclosure.

Referring to FIG. 13, the processes for garbage collection operation can include checking whether command(s) entered from a host is(are) carried out in the nonvolatile memory device 1006 (S1202), searching for valid data in a predetermined amount of data stored in the nonvolatile memory device 1006 when the nonvolatile memory device 1006 is idle (S1204), moving searched valid data to an empty block in the nonvolatile memory device 1006 (S1206).

The garbage collection described above might be a conditional operation. In step S1202, it is confirmed whether the memory system 1002 normally receives the command. In step S1204, the garbage collection is performed when the memory system 1002 is idle. The idle state may include a state in which the device 1006 is in an operable state but not in use, or a state in which the device 1006 is waiting for an instruction to initiate an operation.

In steps S1202, S1204, it is shown that garbage collection is executed as a background task or a background operation. That is, even if there is no command transmitted through the host, the memory system 1002 can work on its own. On the other hand, even if the memory system 1002 is doing its own garbage collection, the garbage collection can be terminated immediately if a command is entered from the host.

When the memory system 1002 is in the idle state as checked in step S1204, the garbage collection may start. In step S1204, the controller 1004 repeatedly searches for valid data in a predetermined amount of data stored in the nonvolatile memory device 1006 and stores the searched valid data in the memory 1008. The valid data loaded in the memory 1008 through step S1204 is moved to an available free block in the nonvolatile memory device 1006 in step S1206.

In the embodiment, a process of erasing a block storing data, which is previously valid but now moved to a free block and thus becomes invalid, is omitted in the entire process of garbage collection. Here, the erasing process can be performed directly after the data is moved to a free block or directly before new data is programmed into the free block. The erasing process can be performed when the memory system 1002 has an operational margin.

Figure 14:
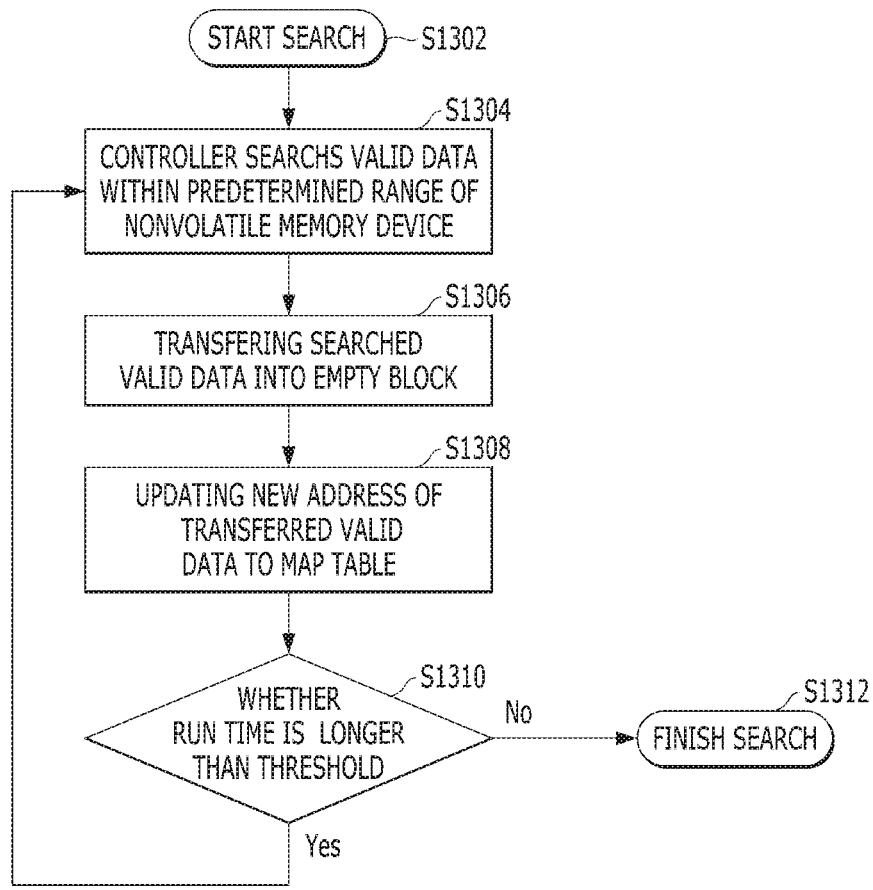
FIG. 14 is a flowchart describing a garbage collection operation and time management in accordance with an embodiment of the disclosure.

FIG. 14 is a flowchart illustrating garbage collection and time management in accordance with an embodiment of the disclosure.

Referring to FIG. 14, the garbage collection can include starting a valid data search (S1302), searching for valid data in a predetermined amount of data stored in the nonvolatile memory device 1006 (S1304), moving searched valid data into an empty block of the nonvolatile memory device 1006 (S1306), updating the new address of the moved data to the map table (S1308), checking whether consumed time is shorter than a threshold time (S1310), and ending the valid data search (S1312).

In step S1302, the valid data search for garbage collection can be begun when the memory system 1002 is in an idle. In step S1302, for example, the controller 1004 of the memory system 1002 may generate an internal command to start the valid data search.

In step S1304, the controller 1004 may search for valid data in a predetermined amount of data stored in the non-volatile memory device 1006. Herein, the predetermined amount of data stored in the nonvolatile memory device 1006 can be determined based on at least one of a storage capacity of the memory 1008 included in or engaged with the controller 1004, a data unit used by the host, or a size of the map data stored in the nonvolatile memory device 1006. The searched valid data can be stored in the memory 1008 of the controller 1004 before being moved into a free block in the nonvolatile memory device 1006.

In step S1306, after the controller 1004 completes the search in step S1304, the controller 1004 moves the valid data stored in the controller's internal memory 1008 to an available free block in the non-volatile memory device 1006. Here, the movement includes an operation similar to a program operation corresponding to a program command or a write command.

In step S1308, the controller 1004 updates the new address of the moved valid data to the map table. If step S1306 is completed, then two pages programmed with the same data may exist in the non-volatile memory device 1006. The data stored in the page corresponding to the post-update address becomes valid in the non-volatile memory device 1006, while the data stored in the page not corresponding to the address of the post-update map data becomes invalid. Invalid data can be deleted later.

In step S1310, the time between the start of step S1302 and the completion of step S1308 for the predetermined amount of data stored in the nonvolatile memory device 1006 is compared with a predetermined threshold time. That is, measured time spent on all the steps after the valid data search starts until the address is finally updated may be compared with the predetermined threshold time. Here, the threshold time may be set according to a predetermined method, which is a time allocated or available for garbage collection. In accordance with an embodiment, the threshold time may be fixed or dynamically determined by analyzing a log, a history or a pattern for executing a command transmitted from the host.

When it is determined that measured or monitored time is less than the predetermined threshold time in step S1310, the process returns to step S1304 to repeat the same steps for another data stored in the nonvolatile memory device 1006. When the measured time is greater than or equal to the predetermined threshold time, the search is terminated. That is, the searching, moving, and updating processes are repeatedly performed until the measured time becomes larger than the predetermined threshold time. Step S1312 can include terminating the garbage collection.

For the first iteration, the step S1310 follows the step S1304, the step S1306 and the step S1308 from the start of the step S1302, to measure the time until the completion of the step S1308 and compare the measured time with the predetermined threshold time. For a subsequent iteration, a plurality of times spent on steps of S1304, S1306, S1308, S1310 are sequentially performed, and the time is measured from the start of the first step S1302 until the completion of the last step S1308 so that the measured time is compared with a predetermined threshold time.

In an embodiment, since the time of step S1302 may be shorter than those of other steps and the step S1304 starts at a substantially same time as the search start instruction, the timing of the step S1302 and the timing immediately before the start of the step S1304 may be considered substantially the same. Since step S1310 is merely a step of confirming, it may be considered that the completion time of step S1308 and the time of step S1310 are substantially same.

Figure 15:
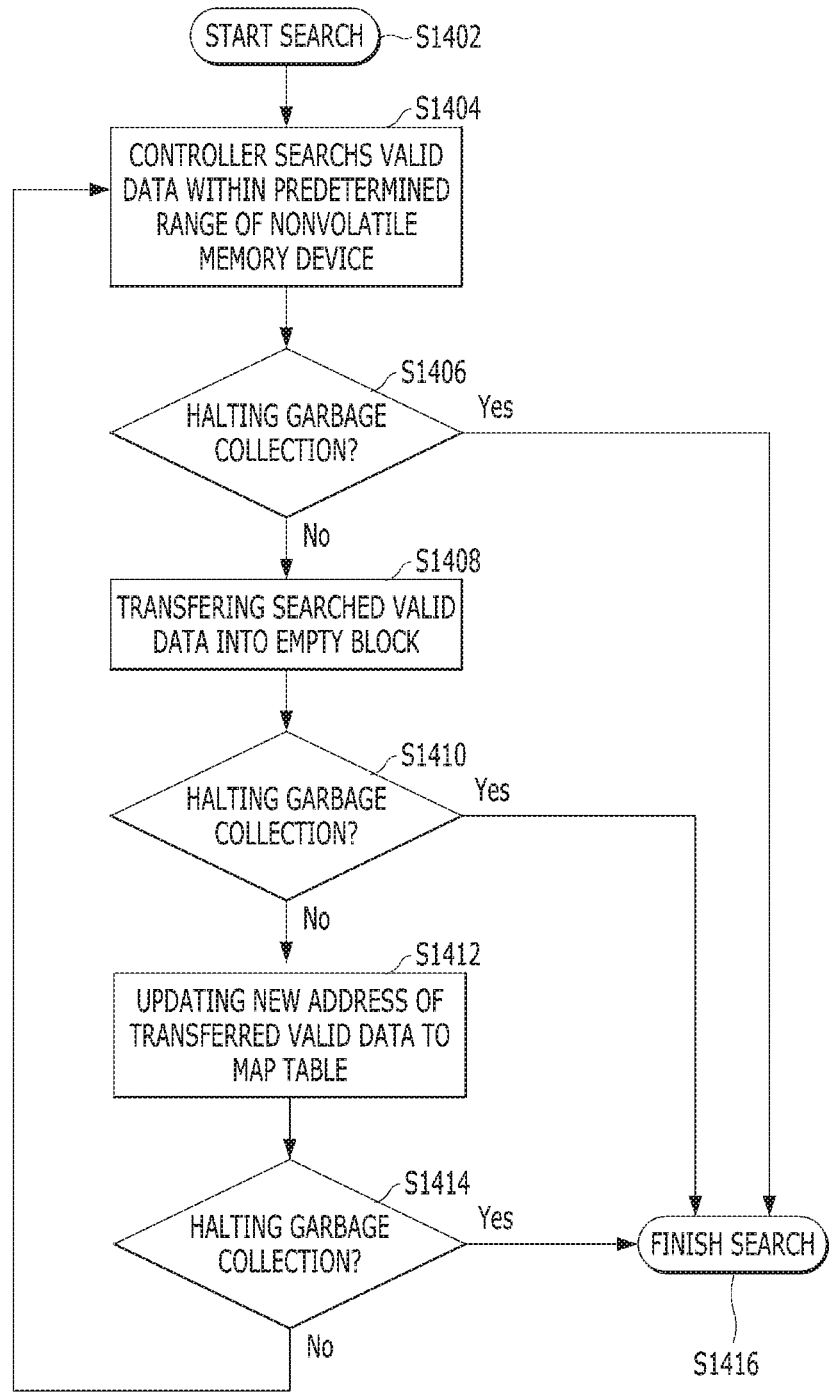
FIG. 15 is a flowchart illustrating a garbage collection operation and time management in accordance with an embodiment of disclosure.

FIG. 15 is a flowchart illustrating garbage collection and time management in accordance with an embodiment of the disclosure.

Referring to FIG. 15, the garbage collection can includes starting a valid data search (S1402), searching for valid data in a predetermined amount of data stored in the nonvolatile memory device 1006 (S1404), checking cease or halt of garbage collection (S1406), moving searched valid data into an empty block of the nonvolatile memory device 1006 (S1408), checking cease or halt of garbage collection (S1410), updating the new address of the moved data to the map table (S1412), checking cease or halt of garbage collection (S1414), and terminating the valid data search (S1416).

FIG. 15 can provide a more specific time management scheme than the one shown in FIG. 14. The basic flow and configuration may be considered very similar, but plural steps of adding an event to check whether the garbage collection is stopped or halted are included in the process of searching valid data for garbage collection. The checking cease or halt of garbage collection is inserted between each of the main steps S1404, S1408, S1412 so that the event of determining whether the garbage collection is stopped or halted may be checked more often.

That is, the controller may search for the valid data in a predetermined amount of data stored in the non-volatile memory device 1006 (S1404), move searched valid data to an empty block of the non-volatile memory device 1006 (S1408) and update the address of moved data in the map table (S1412). The controller can check whether to cease or halt of garbage collection S1406, S1410, S1414 between the steps of S1404, S1408 and S1412.

On the other hand, in accordance with an embodiment, in the steps of checking cease or halt of garbage collection S1406, S1410, S1414, when the time spent on each step is smaller than a predetermined threshold time, the next step may follow the arrow followed with "No", and, if it is larger than the predetermined threshold time, the search can be terminated along the arrow followed with "Yes."

In step S1402, the valid data search for garbage collection can start when the memory system 1002 is in an idle. Step S1302, for example, the controller 1004 may generate an internal command to start the valid data search in the nonvolatile memory device 1006.

In step S1404, the controller 1004 may search for valid data in a predetermined amount of data stored in the nonvolatile memory device 1006. Search scope, i.e., the predetermined amount of data stored in the nonvolatile memory device 1006, can be determined corresponding to the storage capacity of the memory 1008 within the controller 1004, or determined in accordance with a data unit used by the host, or in accordance with a size of the map data stored in the nonvolatile memory device 1006. Then, searched valid data can be temporary stored in the memory 1008 of the controller 1004.

In step S1406, the time between the start of step S1402 for the first time and the completion of step S1404 can be compared with the predetermined threshold time. That is, the time spent on between when the first search command is applied and when the last valid data search is completed can be monitored and measured, then the measured time can be compared with a predetermined threshold time. Here, the threshold time can be set according to a predetermined method, which is a time allocated for garbage collection or available for searching valid data in garbage collection. In accordance with an embodiment, the threshold time may be fixed or may be dynamically determined by analyzing a log, a history or a pattern in response to commands transmitted from the host.

When the measured time is less than the predetermined threshold time in step S1406, the procedure can proceed to step S1408. If the compared result is greater than or equal to the predetermined threshold time, the valid data search is terminated (S1416).

When the condition from the step S1406 to the step S1408 is satisfied, in step S1408, the valid data stored in the memory 1008 is moved into an available free block of the non-volatile memory device 1006 after the controller 1004 completes the valid data search within the predetermined range in step S1404. The movement of data can include an operation similar to a program operation corresponding to a program command or a write command.

In step S1410, the time from the start of step S1402 for the first time until the completion of step S1408 for the predetermined range is compared with a predetermined threshold time. That is, the time from a timing point of when the search start command is first issued to another timing point of when the last valid search data is moved to the free block of the nonvolatile memory device 1006 is monitored and/or measured. Then, the measured time can be compared with a predetermined threshold time.

If the measured time is less than the predetermined threshold time in step S1410, the process proceeds to step S1412. If the compared result is greater than or equal to the predetermined threshold time, the valid data search is terminated (S1416).

When the condition from step S1410 to step S1412 is satisfied, the controller 1004 updates the new address of the moved valid data to the map table in step S1412. If step S1412 is completed, then two pages programmed with the same data may exist in the nonvolatile memory device. The data stored in the page corresponding to the post-update address becomes valid in the nonvolatile memory device 1006, while the data stored in the page not corresponding to the address of the post-update map data becomes invalid. Then, a block including invalid data can be erased later.

In step S1414, the time from the start of step S1402 to the completion of step S1412 for the predetermined range is compared with a predetermined threshold time. That is, measured time spent on all the steps after the valid data search starts until the address is finally updated may be compared with the predetermined threshold time. Here, the threshold time may be set according to a predetermined method, which is a time allocated or available for garbage collection.

When the measured time is less than the predetermined threshold time in step S1414, the process can return to step S1404 to repeat the same steps. When the compared result is greater than or equal to the predetermined threshold time, the valid data search can be stopped or terminated (S1416).

Step S1416 can include terminating the garbage collection.

For the first iteration, the first step S1414 follows the step S1404, the step S1406, the step S1408, the step S1410 and the step S1412 from the start of the step S1402, for measuring the time until the completion of the step S1412 and compare the measured time with the predetermined threshold time. For a subsequent iteration, a plurality of times spent on steps of S1404, S1406, S1408, S1410, S1412, S1414 are sequentially performed, and the time is measured from the start of the step S1402, to the completion of the last step S1412 so that the measured time is compared with a predetermined threshold time.

In step S1406 and step S1410 of FIG. 15, if the measured time is greater than or equal to the predetermined threshold time, the search is terminated. Otherwise, the process proceeds to the next step as shown in FIG. 15. The controller in the step S1414 can end the valid data search if the consumed time is greater than the predetermined threshold time, and can return to step S1404 as shown in FIG. 15 if not.

In accordance with an embodiment, since the time of step S1402 is shorter than those of other steps and the step S1404 starts at a substantially same time as the search start command, the timing of the step S1402 and the timing immediately before the start of the step S1404 may be considered substantially the same. Since the step S1406, the step S1410, and the step S1414 are merely confirming, the time of step S1406, the completion time of step S1404, the time of step S1410, the completion time of step S1408 and the time of step S1414 and the completion time of step S1412 are substantially the same. For example, the time taken to perform steps S1406, S1410, S1414 may be relatively smaller than those to perform other steps.

Figure 16:
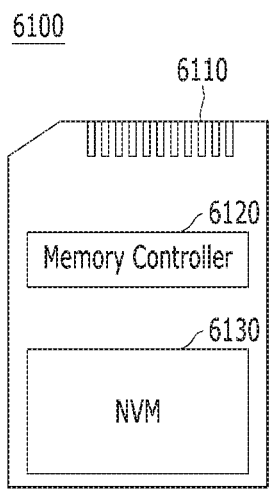
FIGS. 16 to 24 are block diagrams schematically illustrate other data processing systems including a memory system in accordance with an embodiment of the disclosure.

In FIG. 16, another example of the data processing system including the memory system in accordance with the embodiment is described. FIG. 16 schematically illustrates a memory card system to which the memory system in accordance with the embodiment is applied.

Referring to FIG. 16, the memory card system 6100 may include a memory controller 6120, a memory device 6130 and a connector 6110.

The memory controller 6120 may be connected to the memory device 6130 embodied by a nonvolatile memory. The memory controller 6120 may be configured to access the memory device 6130. By way of example but not limitation, the memory controller 6120 may be configured to control read, write, erase and background operations of the memory device 6130. The memory controller 6120 may be configured to provide an interface between the memory device 6130 and a host, and use a firmware for controlling the memory device 6130. That is, the memory controller 6120 may correspond to the controller 130 of the memory system 110 described with reference to FIGS. 1 and 3, and the memory device 6130 may correspond to the memory device 150 of the memory system 110 described with reference to FIGS. 1 and 5.

Thus, the memory controller 6120 may include a RAM, a processing unit, a host interface, a memory interface and an error correction unit. The memory controller 130 may further include the elements shown in FIGS. 1 and 3.

The memory controller 6120 may communicate with an external device, for example, the host 102 of FIG. 1 through the connector 6110. For example, as described with reference to FIGS. 1 to 3, the memory controller 6120 may be configured to communicate with an external device under one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices, particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 5.

The memory controller 6120 and the memory device 6130 may be integrated into a single semiconductor device. For example, the memory controller 6120 and the memory device 6130 may construct a solid state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., a SM and a SMC), a memory stick, a multimedia card (e.g., a MMC, a RS-MMC, a MMCmicro and an eMMC), an SD card (e.g., a SD, a miniSD, a microSD and a SDHC) and a universal flash storage (UFS).

Figure 17:
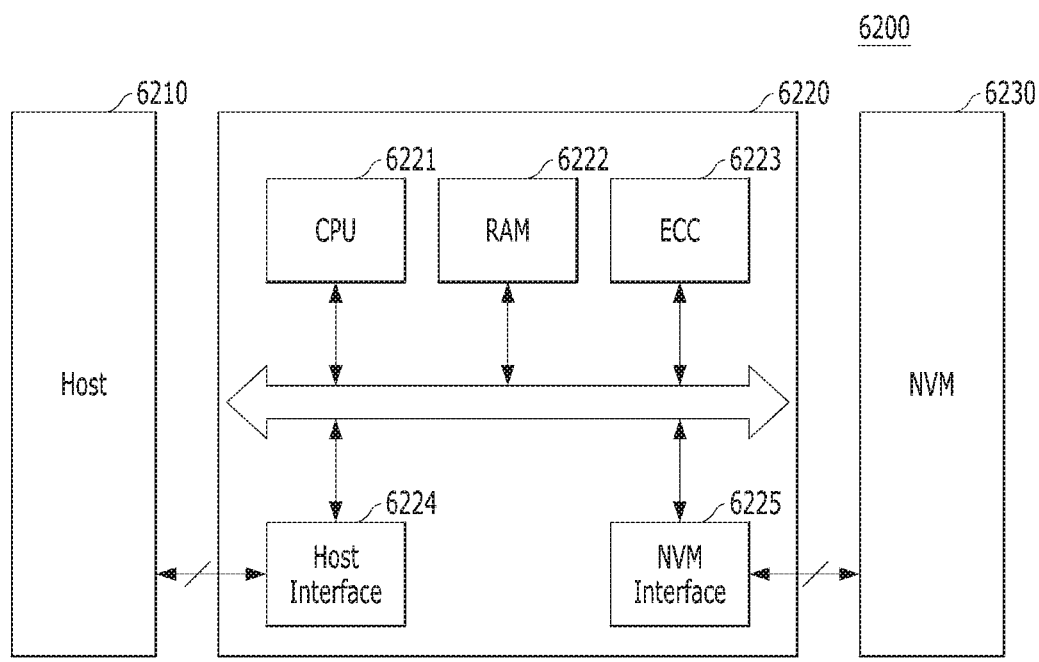

FIG. 17 is a diagram schematically illustrating another example of the data processing system including the memory system in accordance with the embodiment.

Referring to FIG. 17, the data processing system 6200 may include a memory device 6230 having one or more nonvolatile memories and a memory controller 6220 for controlling the memory device 6230. The data processing system 6200 illustrated in FIG. 17 may serve as a storage medium such as a memory card (CF, SD, micro-SD or the like) or USB device, as described with reference to FIGS. 1 and 2. The memory device 6230 may correspond to the memory device 150 in the memory system 110 illustrated in FIGS. 1 and 5. The memory controller 6220 may correspond to the controller 130 in the memory system 110 illustrated in FIGS. 1 and 5.

The memory controller 6220 may control a read, write or erase operation on the memory device 6230 in response to a request of the host 6210. The memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221. The RAM 6222 may be used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 of the controller 130 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. Particularly, as the memory controller 6220 is configured to communicate with the external device through one or more of various communication protocols, the memory system and the data processing system in accordance with the present embodiment may be applied to wired/wireless electronic devices, particularly a mobile electronic device.

Figure 18:
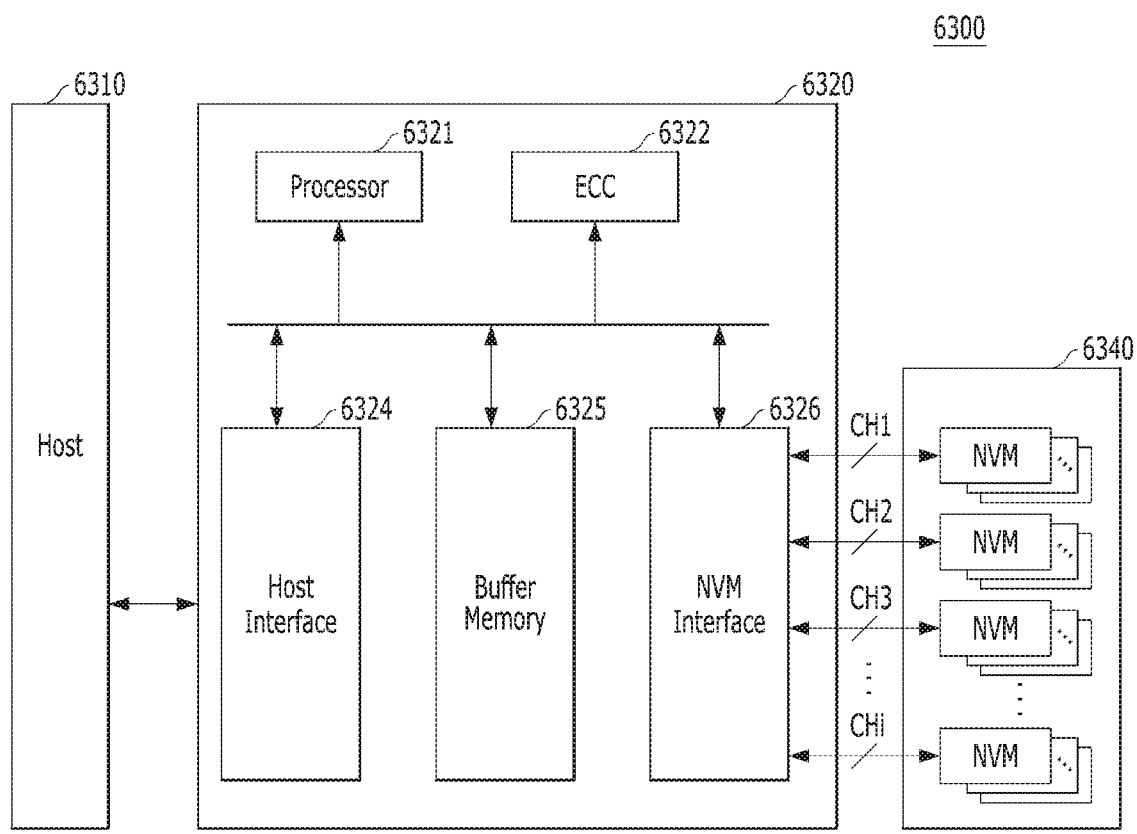

FIG. 18 is a diagram schematically illustrating another example of the data processing system including the memory system in accordance with the embodiment. FIG. 18 schematically illustrates an SSD to which the memory system in accordance with the embodiment is applied.

Referring to FIG. 18, the SSD 6300 may include a controller 6320 and a memory device 6340 including a plurality of nonvolatile memories. The controller 6320 may correspond to the controller 130 in the memory system 110 of FIGS. 1 and 2. The memory device 6340 may correspond to the memory device 150 in the memory system of FIGS. 1 and 5.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. FIG. 18 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation. The ECC circuit 6322 may perform an error correction operation on data read from the memory device 6340 based on the ECC value during a read operation. The ECC circuit 6322 may perform an error correction operation on data recovered from the memory device 6340 during a failed data recovery operation.

The host interface 6324 may provide an interface function with an external device, for example, the host 6310. The nonvolatile memory interface 6326 may provide an interface function with the memory device 6340 connected through the plurality of channels.

Furthermore, a plurality of SSDs 6300 to which the memory system 110 of FIGS. 1 and 5 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300. The RAID controller may output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300. The RAID controller may provide data read from the selected SSDs 6300 to the host 6310.

Figure 19:
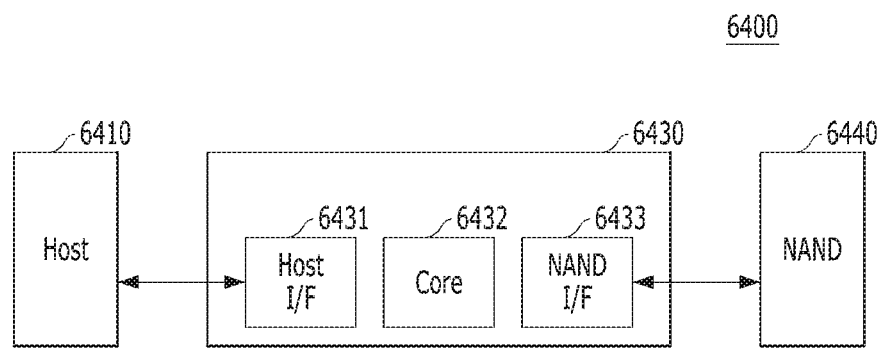

FIG. 19 is a diagram schematically illustrating another example of the data processing system including the memory system in accordance with the embodiment. FIG. 16 schematically illustrates an embedded Multi-Media Card (eMMC) to which the memory system in accordance with the embodiment is applied.

Referring to FIG. 19, the eMMC 6400 may include a controller 6430 and a memory device 6440 embodied by one or more NAND flash memories. The controller 6430 may correspond to the controller 130 in the memory system 110 of FIGS. 1 and 2. The memory device 6440 may correspond to the memory device 150 in the memory system 110 of FIGS. 1 and 5.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400. The host interface 6431 may provide an interface function between the controller 6430 and the host 6410. The NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 17 to 20 are diagrams schematically illustrating other examples of the data processing system including the memory system in accordance with the embodiment. FIGS. 17 to 20 schematically illustrate UFS (Universal Flash Storage) systems to which the memory system in accordance with the embodiment is applied.

Referring to FIGS. 17 to 20, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices, particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices, particularly mobile electronic devices through UFS protocols, and the UFS devices 6520, 6620, 6720, 6820 and the UFS cards 6530, 6630, 6730, 6830 may be embodied by the memory system 110 illustrated in FIGS. 1 and 5. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 13 to 16, and the UFS cards 6530, 6630, 6730, 6830 may be embodied in the form of the memory card system 6100 described with reference to FIG. 16.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, for example, an UFDs, a MMC, a SD, a mini-SD, and a micro-SD.

Figure 20:
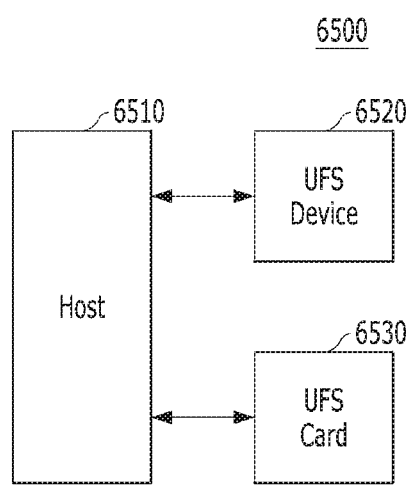

In the UFS system 6500 illustrated in FIG. 20, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410. The form of a star is a sort of arrangements where a single centralized component is coupled to plural devices for parallel processing. A plurality of UFS cards may be connected in parallel or in the form of a star to the UFS device 6520 or connected in series or in the form of a chain to the UFS device 6520.

Figure 21:
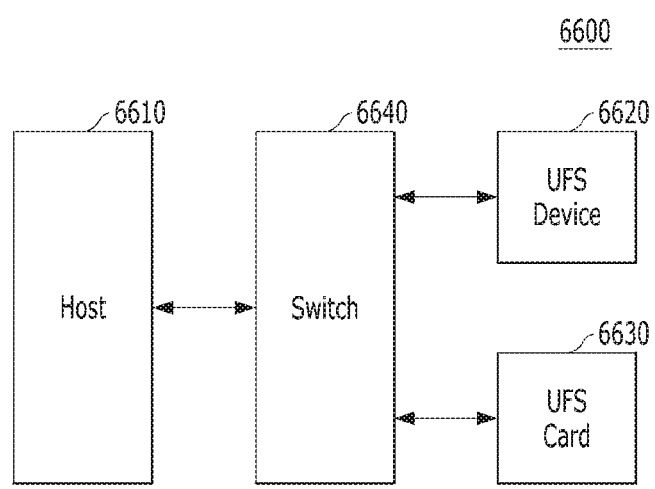

In the UFS system 6600 illustrated in FIG. 21, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 22:
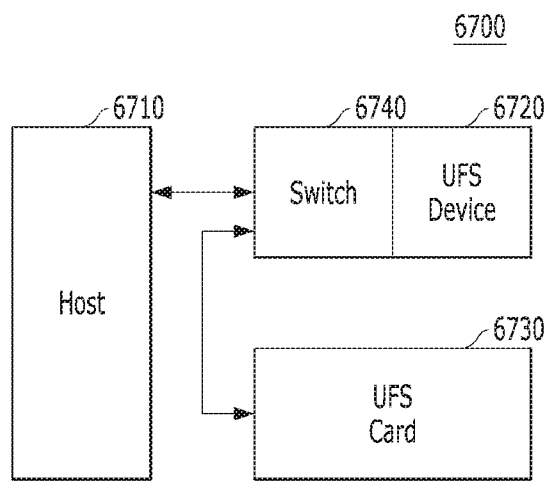

In the UFS system 6700 illustrated in FIG. 22, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host, 6710 or connected in series or in the form of a chain to each other. Furthermore, a plurality of UFS cards may be connected in parallel or in the form of a star to the UFS device 6720.

Figure 23:
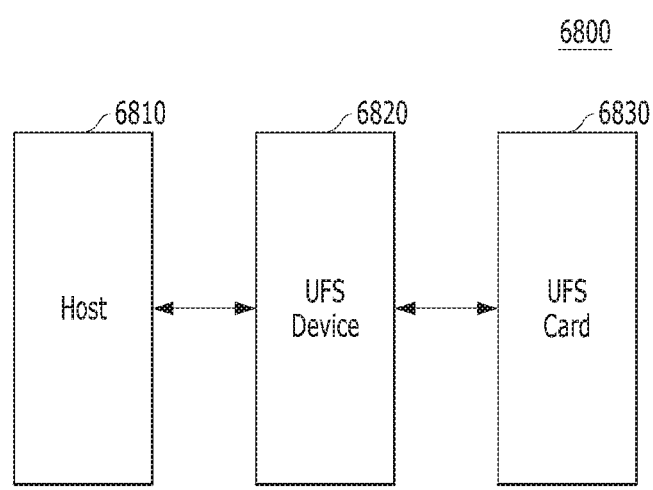

In the UFS system 6800 illustrated in FIG. 23, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 24:
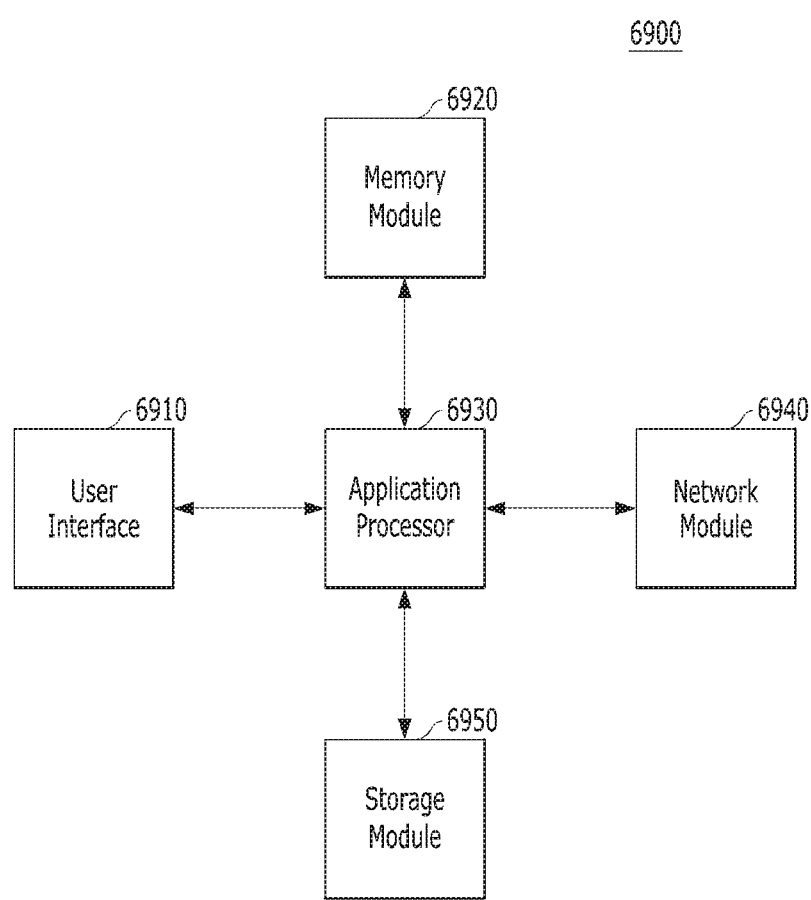

FIG. 24 is a diagram schematically illustrating another example of the data processing system including the memory system in accordance with an embodiment of the present invention. FIG. 24 is a diagram schematically illustrating a user system to which the memory system in accordance with the embodiment is applied.

Referring to FIG. 24, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphics engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIGS. 1 and 5. Furthermore, the storage module 6950 may be embodied as an SSD, an eMMC and an UFS as described above with reference to FIGS. 15 to 20.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIGS. 1 and 5 is applied to a mobile electronic device of the user system 6900, the application processor 6930 may control overall operations of the mobile electronic device. The network module 6940 may serve as a communication module for controlling wired/wireless communication with an external device. The user interface 6910 may display data processed by the processor 6930 on a display/touch module of the mobile electronic device. Further, the user interface 6910 may support a function of receiving data from the touch panel.

In accordance with embodiments described above, a memory system, a data processing system, and an operation method thereof can limit or restrict time spent to search for valid data in a predictable range of a large memory device, which is manageable or controllable to be shorter than an estimated time or an available time. It may be easier to manage foreground or background operations that may be performed through valid data searching in the memory system.

The disclosure provides a memory system which reduces the possibility that other operations to be performed within the memory system may not be carried out smoothly because a time required for foreground or background operations that has been performed through effective data search in the memory system becomes longer than an estimated time so that operation stability and reliability of the memory system can be improved or enhanced.

While the disclosure has been described with respect to the specific embodiments, it will be apparent to those skilled in the art that various changes and modifications may be made without departing from the spirit and scope of the invention as defined in the following claims.

What is claimed is:

1. A memory system, comprising:
    a non-volatile memory device including plural memory blocks storing a data; and
    a controller including, or controlling, a volatile memory device,
    wherein the controller is configured to set a predetermined range in the plural memory blocks, access each memory block included in the predetermined range to load all data included in each memory block in the volatile memory device, select or choose only valid data among the all data loaded in the volatile memory device, re-store selected valid data in the non-volatile memory device, and increase a count of blocks to be erasable among the plural memory blocks by a number of memory blocks included in the predetermined range.

2. The memory system according to claim 1, wherein the predetermined range is determined based at least on a storage capability of the volatile memory.

3. The memory system according to claim 2, wherein the controller repeatedly searches for the valid data on a basis of the predetermined range during an idle state.

4. The memory system according to claim 1, wherein the predetermined range corresponds to a size of data unit entered from a host.

5. The memory system according to claim 4, wherein the predetermined range is determined by dividing a data region of the non-volatile memory device by N (N is an integer larger than 1).

6. The memory system according to claim 5, wherein the predetermined range is determined based at least on a size of a data region of the non-volatile memory device, which is determined by the host as a data region in which no valid data is stored.

7. The memory system according to claim 1, wherein the predetermined range corresponds to a size of map data stored in the non-volatile memory device.

8. The memory system according to claim 7, wherein the predetermined range is determined by dividing the size of map data by N (N is an integer larger than 1).

9. The memory system according to claim 1, wherein the controller transfers searched valid data into an empty block of the non-volatile memory device.

10. The memory system according to claim 9, wherein the controller updates a new address of transferred data in the empty block to a map table of the non-volatile memory device.

11. The memory system according to claim 10, wherein the controller measures a time between starting the search for valid data in a first range and updating an address for searched and transferred data, and
the controller performs at least one of starting the search for valid data in another range when measured time is shorter than a threshold and terminating the search for valid data in another range when the measured time is equal to, or longer than, the threshold.

12. The memory system according to claim 11, wherein, when all pages in a block in the non-volatile memory device do not have any address linked with the map table, the controller erases the block.

13. The memory system according to claim 1, wherein the controller includes
a search circuit for searching for the valid data in the predetermined range; and
a search controller for determining a time for searching and the predetermined range and receiving a search result from the search unit.

14. A method for operating a memory system, the method comprising:
monitoring whether an operation corresponding to a command entered from a host is carried out within a non-volatile memory device to determine whether an idle state is entered;
setting a predetermined range in plural memory blocks of the non-volatile memory device;
accessing each memory block included in the predetermined range to load all data included in each memory block in a volatile memory device;
selecting or choosing only valid data among the all data loaded in the volatile memory device;
transferring searched valid data into an empty block in the non-volatile memory device; and
increasing a count of blocks to be erasable among the plural memory blocks by a number of memory blocks included in the predetermined range.

15. The method according to claim 14, further comprising:
updating a new address of transferred valid data to the empty block to a map table of the non-volatile memory device.

16. The method according to claim 15, further comprising:
measuring a time between starting the search for valid data in a first range and updating an address for searched and transferred data; and
at least one of starting the search for valid data in another range when measured time is shorter than a threshold and terminating the search for valid data in another range when the measured time is equal to, or longer than, the threshold.

17. The method according to claim 16, further comprising erasing a block when all pages in the block in the non-volatile memory device do not have any address linked with the map table.

18. The method according to claim 14, wherein the accessing each memory block and selecting or choosing the valid data only is performed on a basis of the predetermined range during the idle state.

* * * * *